US012652233B2

(12) United States Patent
Abedini et al.

(10) Patent No.: US 12,652,233 B2
(45) Date of Patent: Jun. 9, 2026

(54) CONFIGURATION FOR FORWARDING SIGNALS OVER DIFFERENT TYPES OF WIRELESS COMMUNICATION LINKS

(71) Applicant: QUALCOMM Incorporated, San Diego, CA (US)

(72) Inventors: Navid Abedini, Basking Ridge, NJ (US); Xiaojie Wang, Hillsborough, NJ (US); Jianghong Luo, Skillman, NJ (US); Junyi Li, Fairless Hills, PA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1034 days.

(21) Appl. No.: 17/719,200

(22) Filed: Apr. 12, 2022

(65) Prior Publication Data

US 2023/0327977 A1     Oct. 12, 2023

(51) Int. Cl.
H04L 45/00          (2022.01)
H04W 40/24          (2009.01)
H04W 92/18          (2009.01)

(52) U.S. Cl.
CPC ........... H04L 45/22 (2013.01); H04W 40/248 (2013.01); H04W 92/18 (2013.01)

(58) Field of Classification Search
CPC .... H04L 45/22; H04W 40/248; H04W 92/18; H04W 40/02
See application file for complete search history.

(56) References Cited

U.S. PATENT DOCUMENTS

| | | | | |
|---|---|---|---|---|
| 2019/0313315 A1* | 10/2019 | Xu | ......................... | H04W 24/10 |
| 2020/0260463 A1* | 8/2020 | Lovlekar | ............... | H04W 76/15 |
| 2021/0321367 A1 | 10/2021 | Zhang et al. | | |
| 2022/0060954 A1* | 2/2022 | Xu | ......................... | H04W 36/08 |
| 2024/0080708 A1* | 3/2024 | Rao | ................... | H04W 28/0268 |
| 2024/0098815 A1* | 3/2024 | Freda | .................... | H04W 76/14 |
| 2024/0214988 A1* | 6/2024 | Shrivastava | .......... | H04W 76/27 |
| 2024/0276243 A1* | 8/2024 | Chen | .................... | H04W 76/14 |

FOREIGN PATENT DOCUMENTS

| | | |
|---|---|---|
| EP | 3301985 A1 | 4/2018 |
| WO | 2021067839 A1 | 4/2021 |

OTHER PUBLICATIONS

International Search Report and Written Opinion—PCT/US2023/015899—ISA/EPO—Jun. 14, 2023.

* cited by examiner

*Primary Examiner* — Kibrom T Hailu
(74) *Attorney, Agent, or Firm* — Loza & Loza, LLP

(57)          ABSTRACT

Aspects relate to a wireless communication device that forwards signals over different types of wireless communication links. For example, a wireless communication device may be configured to relay signals for a first type of wireless communication link (e.g., a cellular link such as a Uu link) and also relay signals for a second type of wireless communication link (e.g., a sidelink that uses a PC5 link). The disclosure relates in some aspects to techniques for configuring the wireless communication device to enable the signals for the different types of wireless communication links to be forwarded in an effective manner.

29 Claims, 17 Drawing Sheets

1300

1500

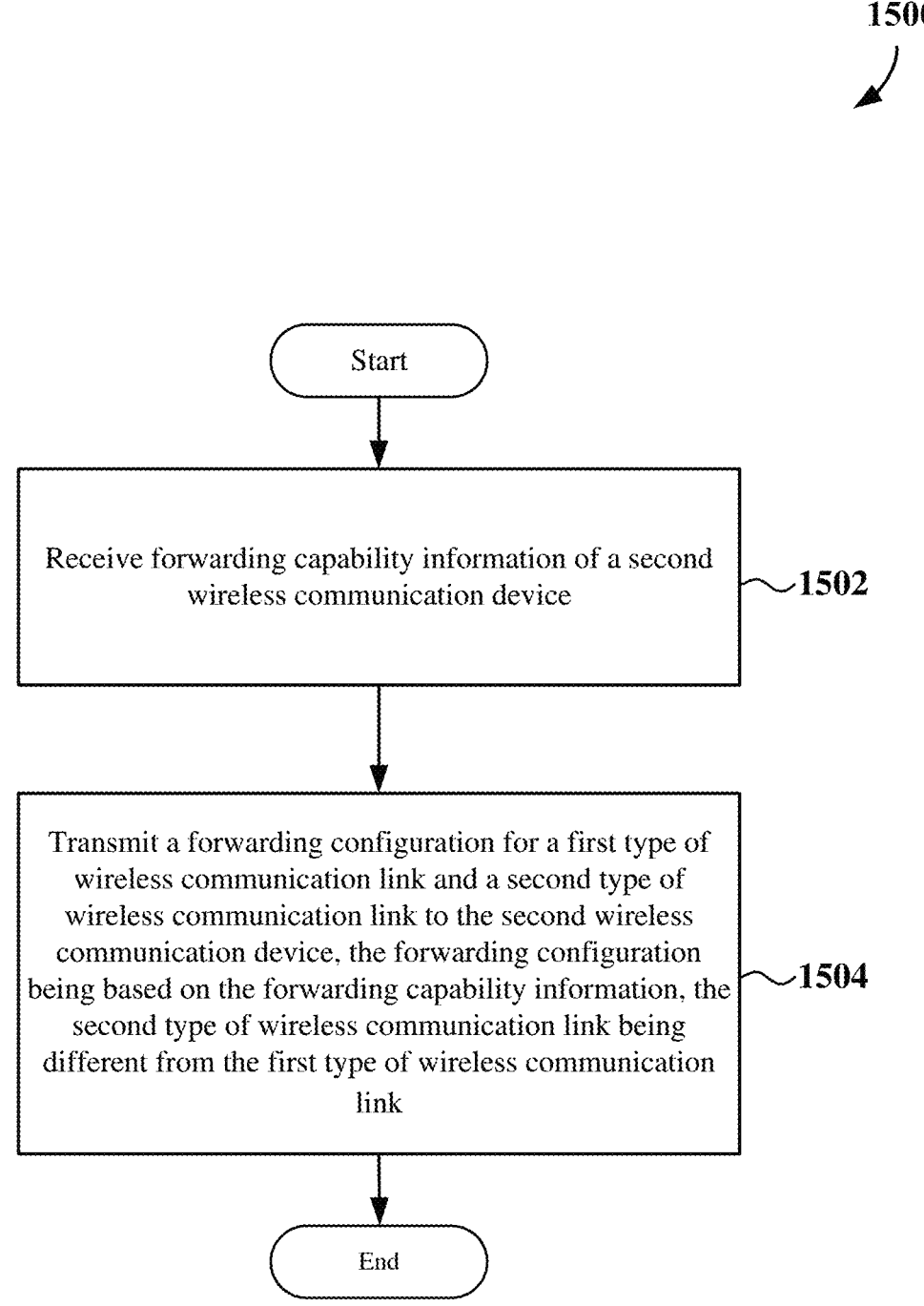

Start

Receive forwarding capability information of a second
wireless communication device                    1502

Transmit a forwarding configuration for a first type of
wireless communication link and a second type of
wireless communication link to the second wireless
communication device, the forwarding configuration
being based on the forwarding capability information, the    1504
second type of wireless communication link being
different from the first type of wireless communication
link End

CONFIGURATION FOR FORWARDING SIGNALS OVER DIFFERENT TYPES OF WIRELESS COMMUNICATION LINKS

TECHNICAL FIELD

The technology discussed below relates generally to wireless communication and, more particularly, to a configuration for a wireless communication device that forwards signals over different types of wireless communication links.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple wireless communication devices. For example, a base station may allocate different resources (e.g., time domain and frequency domain resources) for different wireless communication devices operating within a cell of the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first wireless communication device may include a transceiver, a memory, and a processor coupled to the transceiver and the memory. The processor may be configured to receive, via the transceiver, first signals for a first type of wireless communication link. The processor may also be configured to receive, via the transceiver, second signals for a second type of wireless communication link. In some examples, the second type of wireless communication link is different from the first type of wireless communication link. The processor may further be configured to forward, via the transceiver, the first signals and the second signals according to a forwarding configuration for the first type of wireless communication link and the second type of wireless communication link.

In some examples, a method for wireless communication at a first wireless communication device is disclosed. The method may include receiving first signals for a first type of wireless communication link. The method may also include receiving second signals for a second type of wireless communication link. In some examples, the second type of wireless communication link is different from the first type of wireless communication link. The method may further include forwarding the first signals and the second signals according to a forwarding configuration for the first type of wireless communication link and the second type of wireless communication link.

In some examples, a first wireless communication device may include means for receiving first signals for a first type of wireless communication link. The first wireless communication device may also include means for receiving second signals for a second type of wireless communication link. In some examples, the second type of wireless communication link is different from the first type of wireless communication link. The first wireless communication device may further include means for forwarding the first signals and the second signals according to a forwarding configuration for the first type of wireless communication link and the second type of wireless communication link.

In some examples, a non-transitory computer-readable medium has stored therein instructions executable by one or more processors of a first wireless communication device to receive first signals for a first type of wireless communication link. The computer-readable medium may also have stored therein instructions executable by one or more processors of the first wireless communication device to receive second signals for a second type of wireless communication link. In some examples, the second type of wireless communication link is different from the first type of wireless communication link. The computer-readable medium may further have stored therein instructions executable by one or more processors of the first wireless communication device to forward the first signals and the second signals according to a forwarding configuration for the first type of wireless communication link and the second type of wireless communication link.

In some examples, a first wireless communication device may include a transceiver, a memory, and a processor coupled to the transceiver and the memory. The processor may be configured to receive forwarding capability information of a second wireless communication device via the transceiver. The processor may also be configured to transmit a forwarding configuration for a first type of wireless communication link and a second type of wireless communication link to the second wireless communication device via the transceiver. In some examples, the forwarding configuration is based on the forwarding capability information. In some examples, the second type of wireless communication link is different from the first type of wireless communication link.

In some examples, a method for wireless communication at a first wireless communication device is disclosed. The method may include receiving forwarding capability information of a second wireless communication device. The method may also include transmitting a forwarding configuration for a first type of wireless communication link and a second type of wireless communication link to the second wireless communication device. In some examples, the forwarding configuration is based on the forwarding capability information. In some examples, the second type of wireless communication link is different from the first type of wireless communication link.

In some examples, a first wireless communication device may include means for receiving forwarding capability information of a second wireless communication device. The first wireless communication device may also include means for transmitting a forwarding configuration for a first type of wireless communication link and a second type of wireless communication link to the second wireless communication device. In some examples, the forwarding configuration is based on the forwarding capability information. In some examples, the second type of wireless communication link is different from the first type of wireless communication link.

In some examples, a non-transitory computer-readable medium has stored therein instructions executable by one or more processors of a first wireless communication device to receive forwarding capability information of a second wireless communication device. The non-transitory computer-readable medium may also have stored therein instructions executable by one or more processors of the first wireless communication device to transmit a forwarding configuration for a first type of wireless communication link and a second type of wireless communication link to the second wireless communication device. In some examples, the forwarding configuration is based on the forwarding capability information. In some examples, the second type of wireless communication link is different from the first type of wireless communication link.

In some examples, a first wireless communication device may include a transceiver, a memory, and a processor coupled to the transceiver and the memory. The processor may be configured to receive a forwarding configuration for second wireless communication device via the transceiver. In some examples, the forwarding configuration specifies forwarding requirements for a first type of wireless communication link and a second type of wireless communication link. In some examples, the second type of wireless communication link is different from the first type of wireless communication link. The processor may also be configured to transmit, via the transceiver, first signals to be relayed by the second wireless communication device on the first type of wireless communication link according to the forwarding configuration or receive, via the transceiver, second signals relayed by the second wireless communication device on the first type of wireless communication link according to the forwarding configuration.

In some examples, a method for wireless communication at a first wireless communication device is disclosed. The method may include receiving a forwarding configuration for second wireless communication device. In some examples, the forwarding configuration specifies forwarding requirements for a first type of wireless communication link and a second type of wireless communication link. In some examples, the second type of wireless communication link is different from the first type of wireless communication link. The method may also include transmitting first signals to be relayed by the second wireless communication device on the first type of wireless communication link according to the forwarding configuration or receive second signals relayed by the second wireless communication device on the first type of wireless communication link according to the forwarding configuration.

In some examples, a first wireless communication device may include means for receiving a forwarding configuration for second wireless communication device. In some examples, the forwarding configuration specifies forwarding requirements for a first type of wireless communication link and a second type of wireless communication link. In some examples, the second type of wireless communication link is different from the first type of wireless communication link. The first wireless communication device may also include means for transmitting first signals to be relayed by the second wireless communication device on the first type of wireless communication link according to the forwarding configuration or receive second signals relayed by the second wireless communication device on the first type of wireless communication link according to the forwarding configuration.

In some examples, a non-transitory computer-readable medium has stored therein instructions executable by one or more processors of a first wireless communication device to receive a forwarding configuration for second wireless communication device. In some examples, the forwarding configuration specifies forwarding requirements for a first type of wireless communication link and a second type of wireless communication link. In some examples, the second type of wireless communication link is different from the first type of wireless communication link. The computer-readable medium may also have stored therein instructions executable by one or more processors of the first wireless communication device to transmit first signals to be relayed by the second wireless communication device on the first type of wireless communication link according to the forwarding configuration or receive second signals relayed by the second wireless communication device on the first type of wireless communication link according to the forwarding configuration.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 15 is a flow chart illustrating an example wireless communication method relating to providing a forwarding configuration according to some aspects.

DETAILED DESCRIPTION

Figure 1:
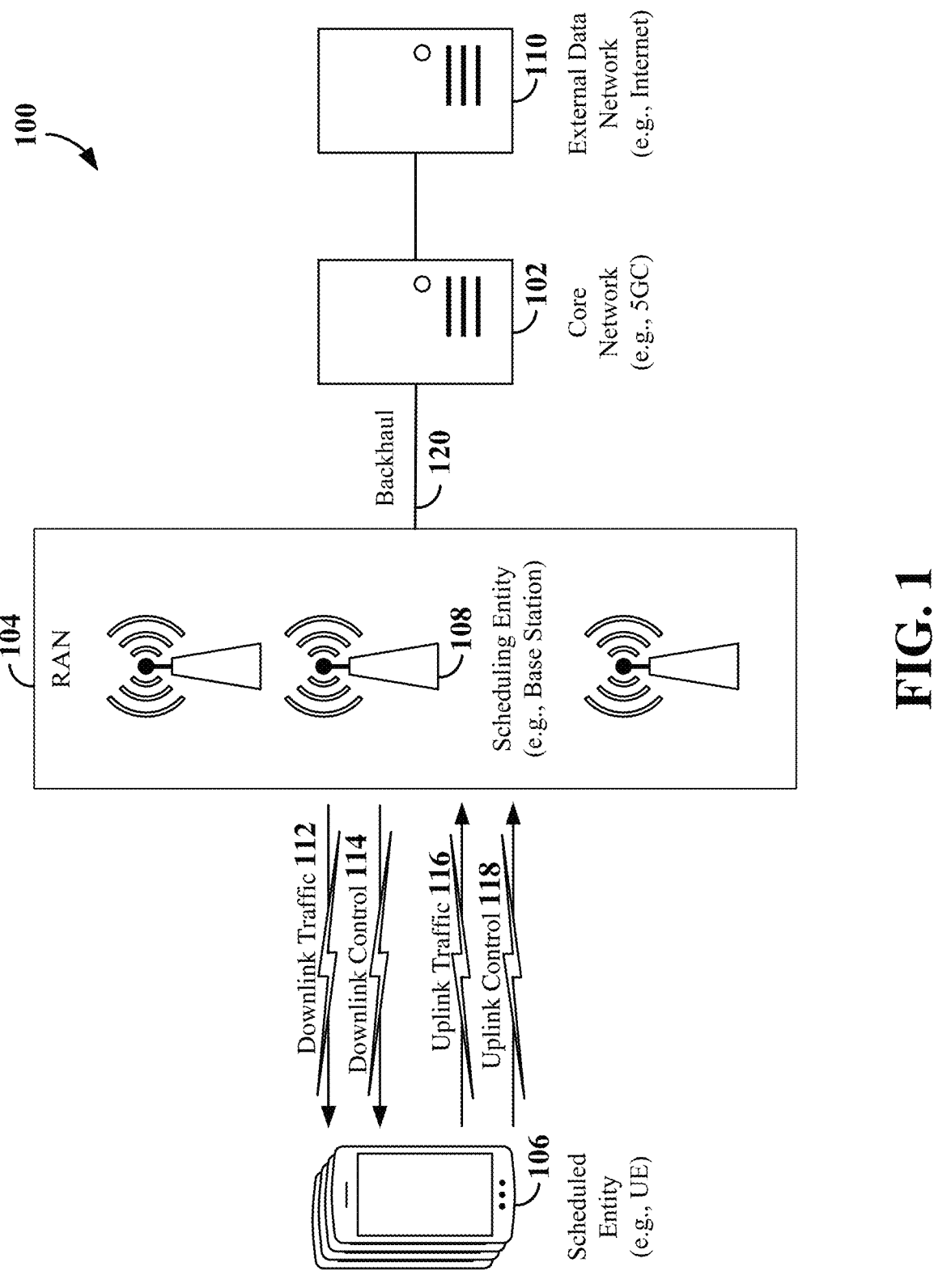
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to a wireless communication device that forwards signals over different types of wireless communication links. For example, a wireless communication device such as a repeater, a relay, a reflector, and so on may be configured to relay signals for a first type of wireless communication link (e.g., a cellular link such as a Uu link) and also relay signals for a second type of wireless communication link (e.g., a sidelink that uses a PC5 link). The forwarding of these signals may be accomplished through one or more of time division multiplexing, frequency division multiplexing, or spatial division multiplexing. Thus, in some cases, the signals for different wireless communication links may be forwarded one after the other or at the same time.

Since the wireless communication device may forward signals for different types of communication links, conflicts may arise as to the forwarding requirements of these different types of communication links. The disclosure relates in some aspects to techniques for configuring a wireless communication device to avoid and/or respond to such conflicts. The configuration of the wireless communication device may be controlled by a base station, controlled by a UE, autonomously controlled, or preconfigured in various examples.

In some examples, the wireless communication device may advertise its forwarding capabilities to one or more other wireless communication devices (e.g., a base station and/or a UE involved in the relaying operations). In this case, the configuration of the wireless communication device for forwarding signals on the different types of wireless communication links may depend on the forwarding capabilities of the wireless communication device. In some examples, one or more of these devices may corroborate (e.g., negotiate) to select the particular configuration to use for a specific forwarding operation.

In some examples, the wireless communication device may identify a conflict in the configuration of the wireless communication device for forwarding signals on the different types of wireless communication links. For example, the wireless communication device may determine that the configuration conflicts with the forwarding capabilities of the wireless communication device. In the event of a conflict, the wireless communication device may take action to address the conflict. For example, the wireless communication device may cancel a forwarding operation configured for one or more of the wireless communication links, or otherwise modify one or more of these forwarding operations.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant quality of service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
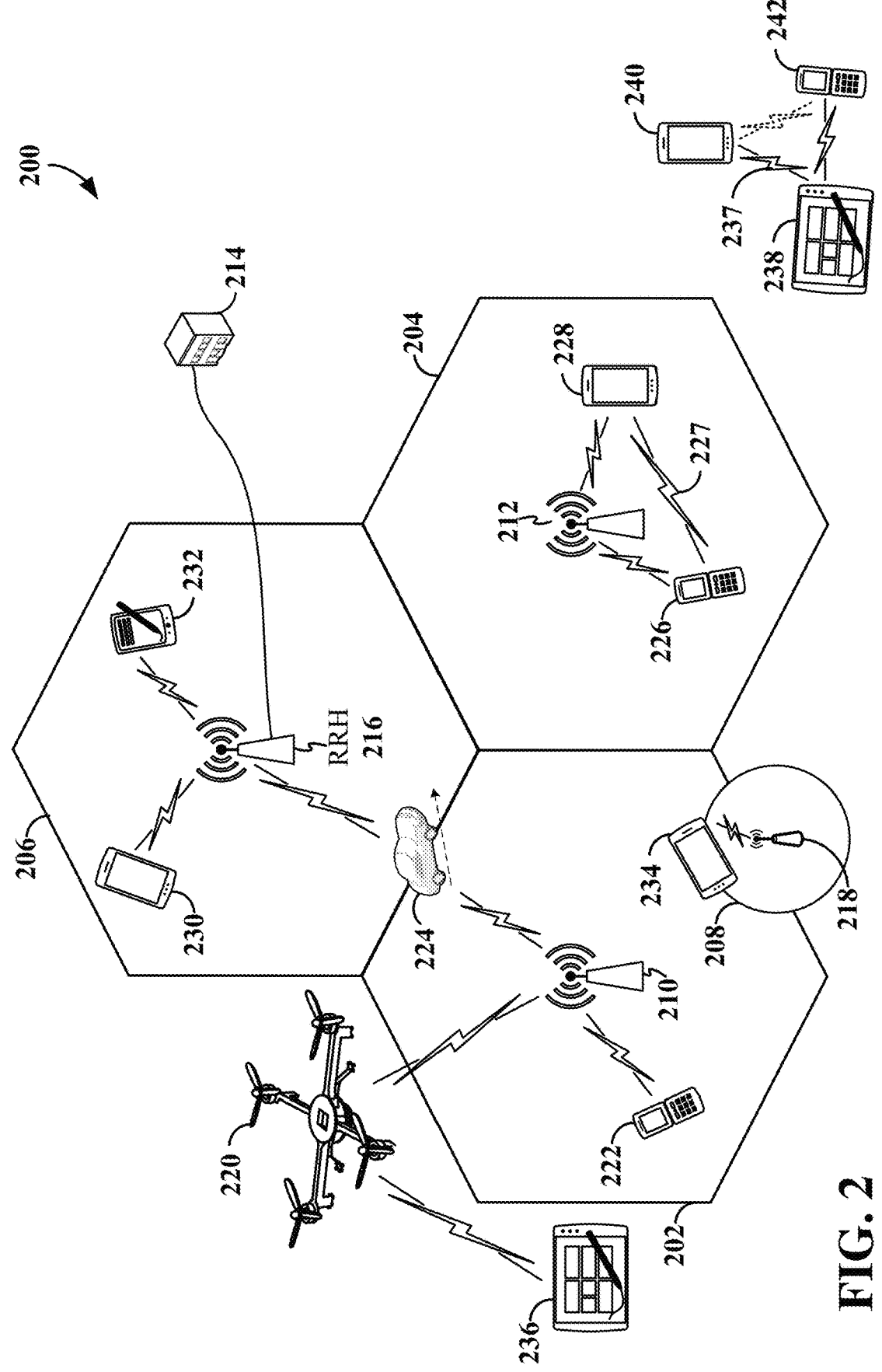
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Figure 3:
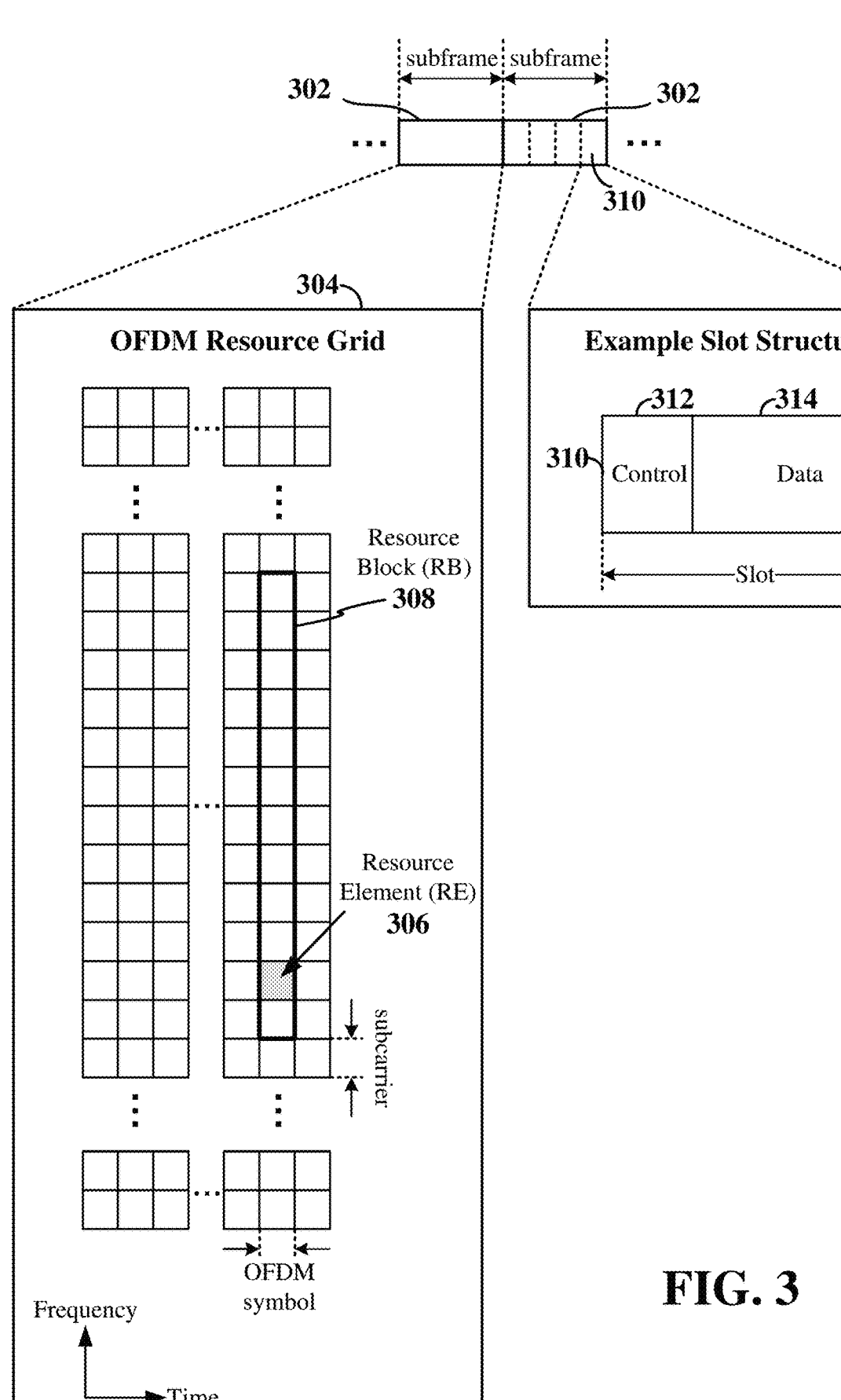
FIG. 3 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
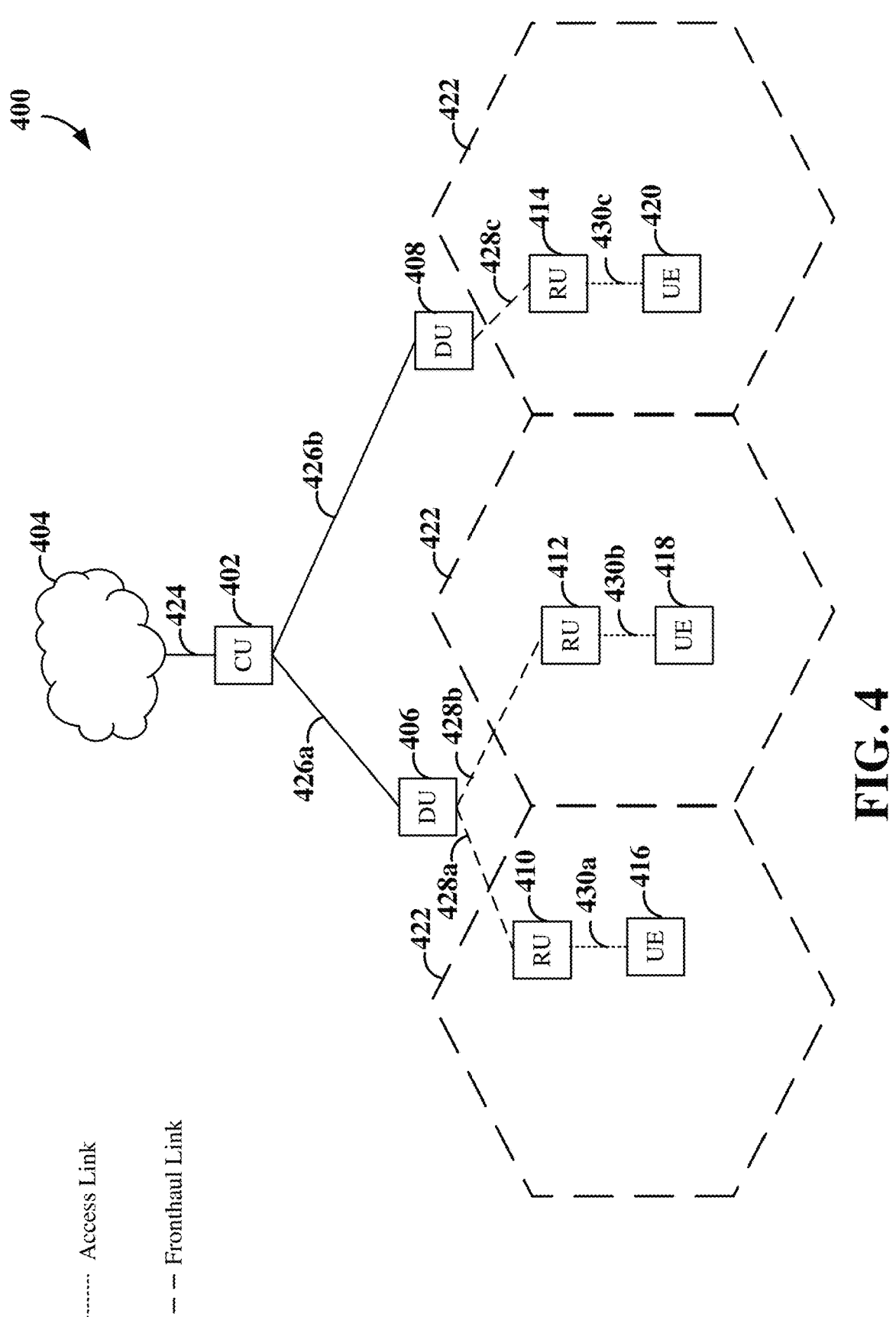
FIG. 4 is a schematic illustration of an example of distributed entities in a wireless communication network according to some aspects.

FIG. 4 is a diagram illustrating an example of a RAN 400 including distributed wireless communication devices (entities) according to some aspects. The RAN 400 may be similar to the radio access network 200 shown in FIG. 2, in that the RAN 400 may be divided into a number of cells (e.g., cells 422) each of which may be served by respective network nodes (e.g., control units, distributed units, and radio units). The network nodes may constitute access points, base stations (BSs), eNBs, gNBs, or other nodes that utilize wireless spectrum (e.g., the radio frequency (RF) spectrum) and/or other communication links to support access for one or more UEs located within the cells. In some examples, some of nodes of FIG. 4 may be implemented as an integrated access backhaul (IAB).

In the example of FIG. 4, a control unit (CU) 402 communicates with a core network 404 via a backhaul link 424, and communicates with a first distributed unit (DU) 406 and a second distributed unit 408 via respective midhaul links 426a and 426b. The first distributed unit 406 communicates with a first radio unit (RU) 410 and a second radio unit 412 via respective fronthaul links 428a and 428b. The second distributed unit 408 communicates with a third radio unit 414 via a fronthaul link 428c. The first radio unit 410 communicates with at least one UE 416 via at least one RF access link 430a. The second radio unit 412 communicates with at least one UE 418 via at least one RF access link 430b. The third radio unit 414 communicates with at least one UE 420 via at least one RF access link 430c.

In some examples, a control unit (e.g., the CU 402) is a logical node that hosts a packet data convergence protocol (PDCP) layer, a radio resource control (RRC) layer, a service data adaptation protocol (SDAP) layer and other control functions. A control unit may also terminate interfaces (e.g., an E1 interface, an E2 interface, etc., not shown in FIG. 4) to network nodes (e.g., nodes of a core network). In addition, an F1 interface (not shown in FIG. 4) may provide a mechanism to interconnect a control unit (e.g., the PDCP layer and higher layers) and a distributed unit (e.g., the radio link control (RLC) layer and lower layers). In some aspects, an F1 interface may provide control plane and user plane functions (e.g., interface management, system information management, UE context management, RRC message transfer, etc.). For example, the F1 interface may support F1-C on the control plane and F1-U on the user plane. F1AP is an application protocol for F1 that defines signaling procedures for F1 in some examples.

In some examples, a distributed unit (e.g., the DU 406 or the DU 408) is a logical node that hosts an RLC layer, a medium access control (MAC) layer, and a high physical (PHY) layer based on a lower layer functional split (LLS). In some aspects, a distributed unit may control the operation of at least one radio unit. A distributed unit may also terminate interfaces (e.g., F1, E2, etc.) to the control unit and/or other network nodes. In some examples, a high PHY layer includes portions of the PHY processing such as forward error correction 1 (FEC 1) encoding and decoding, scrambling, modulation, and demodulation.

In some examples, a radio unit (e.g., the RU 410, the RU 412, or the RU 414) is a logical node that hosts low PHY layer and radio frequency (RF) processing based on a lower layer functional split. In some examples, a radio unit may be similar to a 3GPP transmit receive point (TRP) or remote radio head (RRH), while also including the low PHY layer. In some examples, a low PHY layer includes portions of the PHY processing such as fast Fourier transform (FFT), inverse FFT (iFFT), digital beamforming, and physical random access channel (PRACH) extraction and filtering. The radio unit may also include a radio chain for communicating with one or more UEs.

Figure 5:
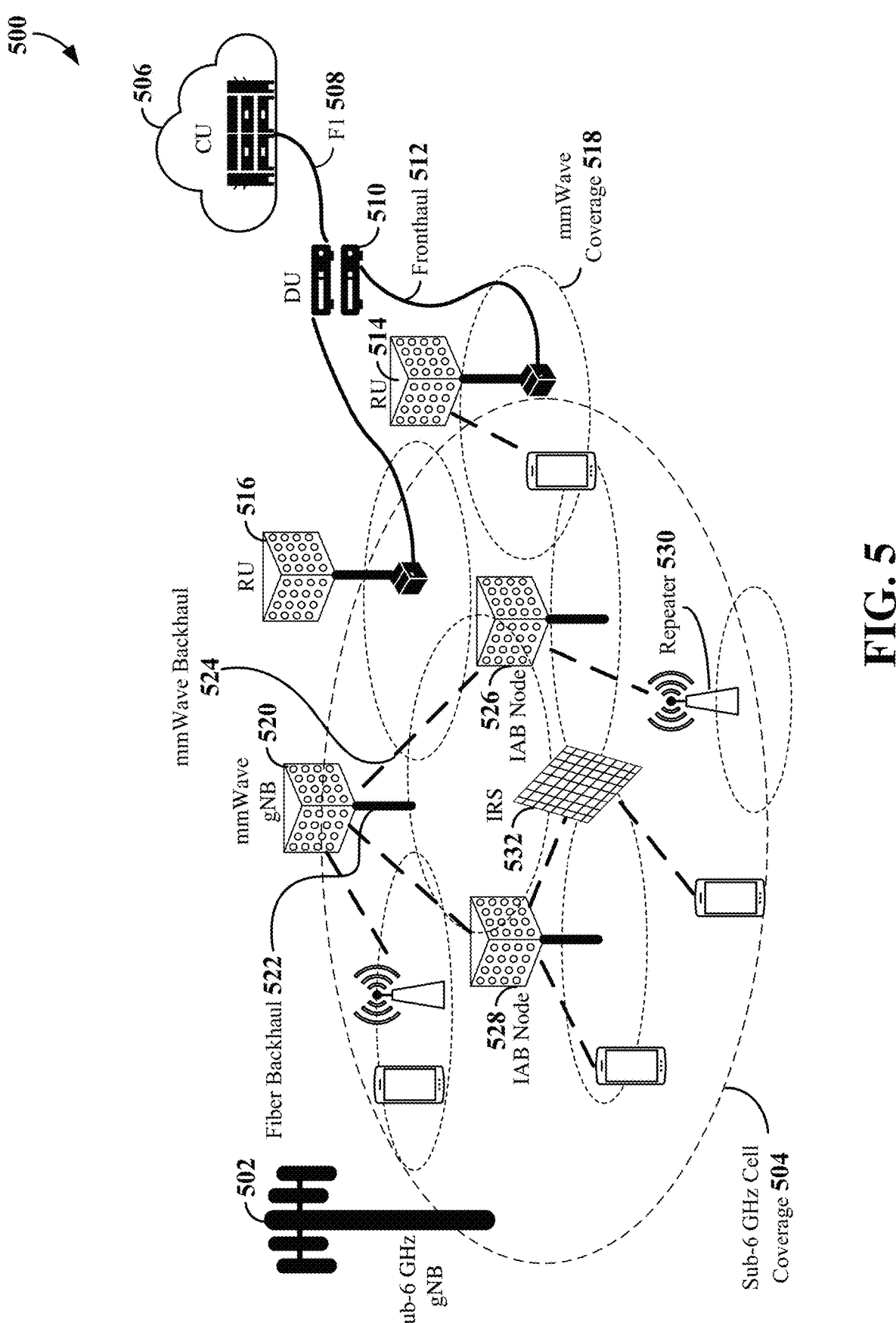
FIG. 5 is a conceptual illustration of a wireless communication system employing assisting nodes according to some aspects.

To provide a sufficient level of wireless communication capacity (e.g., connectivity, bandwidth, and throughput) and reliable coverage, a network may employ so-called assisting nodes which serve to increase the density of points of access in the network. FIG. 5 illustrates an example of a wireless communication system 500 that includes remote units, repeaters, and reflectors to provide network densification.

The wireless communication system 500 includes a sub-6 GHz gNB 502 that provides sub-6 GHz coverage 504. The wireless communication system 500 also includes a CU 506 that is connected via an F1 interface 508 to a DU 510. The DU 510 is connected via one or more fronthaul links 512 to an RU 514 and an RU 516. As indicated, the RU 514 provide mmWave coverage 518. Thus, the distributed architecture with remote units serves to increase the network densification (above and beyond the sub-6 GHz coverage 504) and, in some cases, provides higher levels of service (e.g., greater bandwidth and throughput).

The wireless communication system 500 further includes a mmWave gNB 520 that is connected to the core network via a fiber backhaul 522. As indicated, the mmWave gNB 520 provides a mmWave backhaul 524 for IAB nodes 526 and 528. FIG. 5 also illustrates that the IAB node 526 communicates with a repeater 530 for extending the coverage of the IAB node 526. Similarly, the IAB node 528 communicates with an intelligent reflecting surface (IRS) 532 for extending the coverage of the IAB node 528.

The repeater 530 and the IRS 532 are examples of the assisting nodes mentioned above. These types of assisting nodes may be used to extend the coverage of DU cells or other cells. In some examples, some types of assisting nodes such as repeaters, reflectors, and lower-layer relays (e.g., wireless RUs or TRPs) may have very limited (or no) scheduling capability or MAC functionality. For example, these assisting nodes may carry the same physical cell identifier (PCID) as their corresponding donor cell(s).

Figure 6:
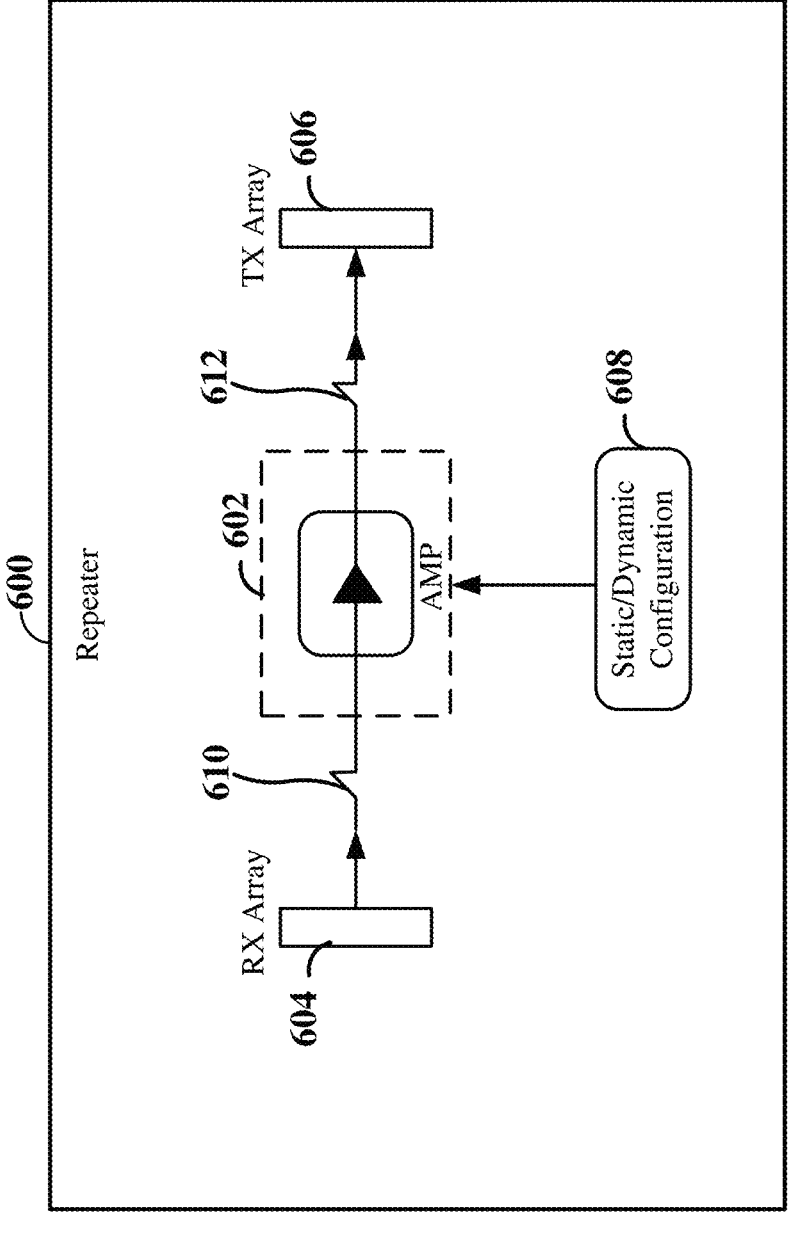
FIG. 6 is a schematic illustration of an example of a repeater according to some aspects.

FIG. 6 illustrates one example of a low-functionality assisting node, specifically, a repeater 600. The repeater 600 may include an amplifier 602, one or more antenna arrays (or antennas, antenna panels, and/or the like) such as a first array 604 and second array 606, and a configuration unit 608.

An antenna array may include multiple antenna elements capable of being configured for beamforming. An antenna array may be referred to as a phased array because phase values and/or phase offsets of the antenna elements may be configured to form a beam, with different phase values and/or phase offsets being used for different beams (e.g., in different directions). In some aspects, an antenna array may be a fixed receive (Rx) antenna array capable of only receiving communications while not transmitting communications. In some aspects, an antenna array may be a fixed transmit (Tx) antenna array capable of only transmitting communications while not receiving communications. In some aspects, an antenna array may be configured to act as an Rx antenna array or a Tx antenna array (e.g., via a Tx/Rx switch, a MUX/DEMUX, and/or the like). An antenna array may be capable of communicating using millimeter waves and/or other types of RF analog signals.

The amplifier 602 includes one or more components capable of amplifying an input signal and outputting an amplified signal. For example, the amplifier 602 may include a power amplifier, a variable gain component, and/or the like. In some examples, the amplifier 602 may have variable gain control. In some examples, the level of amplification of the amplifier 602 may be controlled by the configuration unit 608 (e.g., under the direction of the network).

Switches 610 and 612 include one or more components capable of enabling the repeater 600 to use different antenna arrays for receiving or transmitting. For example, the repeater 600 may include other circuitry and connections (not shown) that would enable reception via the second array 606 and transmission via the first array 604.

Figure 7:
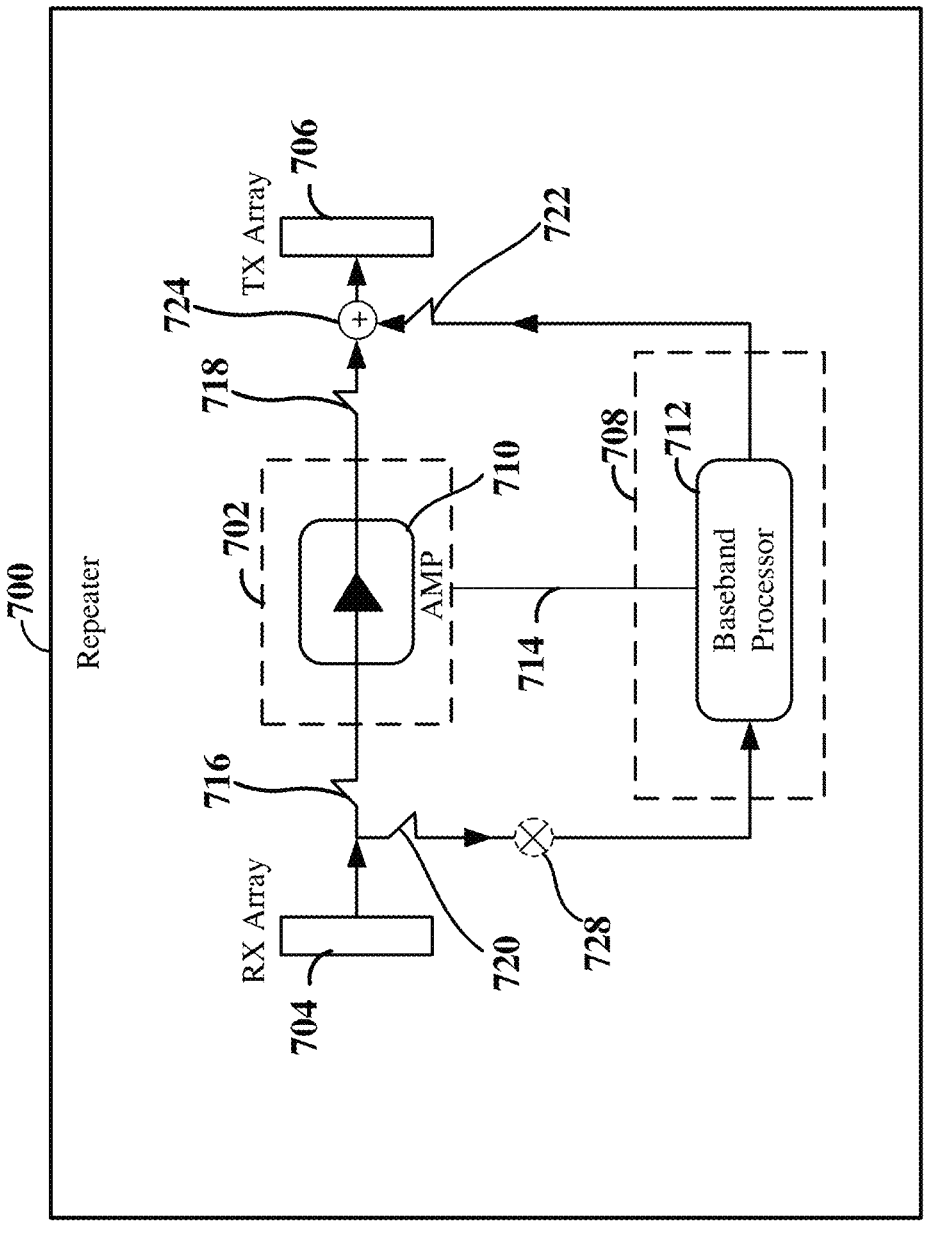
FIG. 7 is a schematic illustration of another example of a repeater according to some aspects.

As mentioned above, in some examples, a repeater may provide higher layer repeating functionality. FIG. 7 illustrates an example of a repeater 700 that may provide decode and forward functionality.

The repeater 700 may include an amplifier unit 702, one or more antenna arrays (or antennas, antenna panels, and/or the like) such as a first array 704 and a second array 706, and a control unit 708 as discussed herein. The amplifier unit 702 includes an amplifier 710 for amplifying signals received via the receive array 704 and transmitting the amplified signals via the transmit array 706. The control unit 708 includes a baseband processor 712 for processing signals received from another node (not shown) over a control path, controlling the operation of the amplifier unit 702 as necessary (e.g., via control signaling 714), and transmitting signals to the other node via the control path.

The amplifier 710 includes one or more components capable of amplifying an input signal and outputting an amplified signal. For example, the amplifier 710 may include a power amplifier, a variable gain component, and/or the like. In some aspects, amplifier 710 may have variable gain control. In some examples, the level of amplification of the amplifier 710 may be controlled by the baseband processor 712 (e.g., under the direction of a base station).

The baseband processor 712 includes one or more components capable of controlling one or more other components of the repeater 700. For example, the baseband processor 712 may include a controller, a microcontroller, a processor, and/or the like. In some aspects, the baseband processor 712 may control a level of amplification or gain applied by the amplifier 710 to an input signal. Additionally, or alternatively, the baseband processor 712 may control an antenna array by controlling a beamforming configuration for the antenna array (e.g., one or more phase values for the antenna array, one or more phase offsets for the antenna array, one or more power parameters for the antenna array, one or more beamforming parameters for the antenna array, a Tx beamforming configuration, an Rx beamforming configuration, and/or the like), by controlling whether the antenna array acts as a receive antenna array or a transmit antenna array (e.g., by configuring interaction and/or connections between the antenna array and switches), and/or the like. Additionally, or alternatively, the baseband processor 712 may power on or power off one or more components of the repeater 700 (e.g., when a base station does not need to use the repeater to serve UEs). In some aspects, the baseband processor 712 may control timing of one or more of the above configurations.

The baseband processor 712 may include a component capable of communicating with another node (e.g., a base station) via the control path. In some aspects, the baseband processor 712 may communicate with the other node using one or more in-band radio frequencies (e.g., radio frequencies that are included within an operating frequency bandwidth of the antenna arrays). In this case, the other node may configure a BWP within the operating frequency bandwidth of the antenna arrays (e.g., an in-band BWP) such that the BWP carries the control interface associated with the repeater 700.

In some examples, the baseband processor 712 may include one or more components for digital signal processing (e.g., digital signal processor, a baseband processor, a digital-to-analog converter (DAC), an analog-to-digital converter (ADC), and/or the like). In this way, the baseband processor 712 may demodulate, decode, and/or perform other types of processing on the control information received from a base station.

Switches 716, 718, 720, and 722 include one or more components capable of enabling the repeater 700 to either relay a signal received via a receive antenna array or to transmit an RF analog signal generated by the repeater 700 (e.g., generated by the amplifier unit 702). For example, in one configuration, the switches 716, 718, 720, and 722 may be configured to couple the amplifier unit 702 to the first array 704 and the second array 706. In another configuration, the switches 716, 718, 720, and 722 may be configured to couple the control unit 708 to the first array 704 and the second array 706. In some examples, the position of each of the switches 716, 718, 720, and 722 may be controlled by the control unit 708.

Switches (not shown) may be used to multiplex and/or demultiplex communications received from and/or transmitted to an antenna array. For example, switches (e.g., multiplexer/demultiplexers) may be used to switch an Rx antenna array to a Tx antenna array, or vice versa.

A summer 724 (e.g., a multiplexer) may include functionality to combine signals from the amplifier 710 with signals from the control unit 708. For example, signals for the data path may be provided on the frequency bands for the BWPs allocated for data transmission, while signals for the control path may be provided on the frequency band(s) for the BWP allocated for control transmission. A demultiplexer 728 could be used in some examples (e.g., to demultiplex the control path from an incoming signal).

Figure 8:
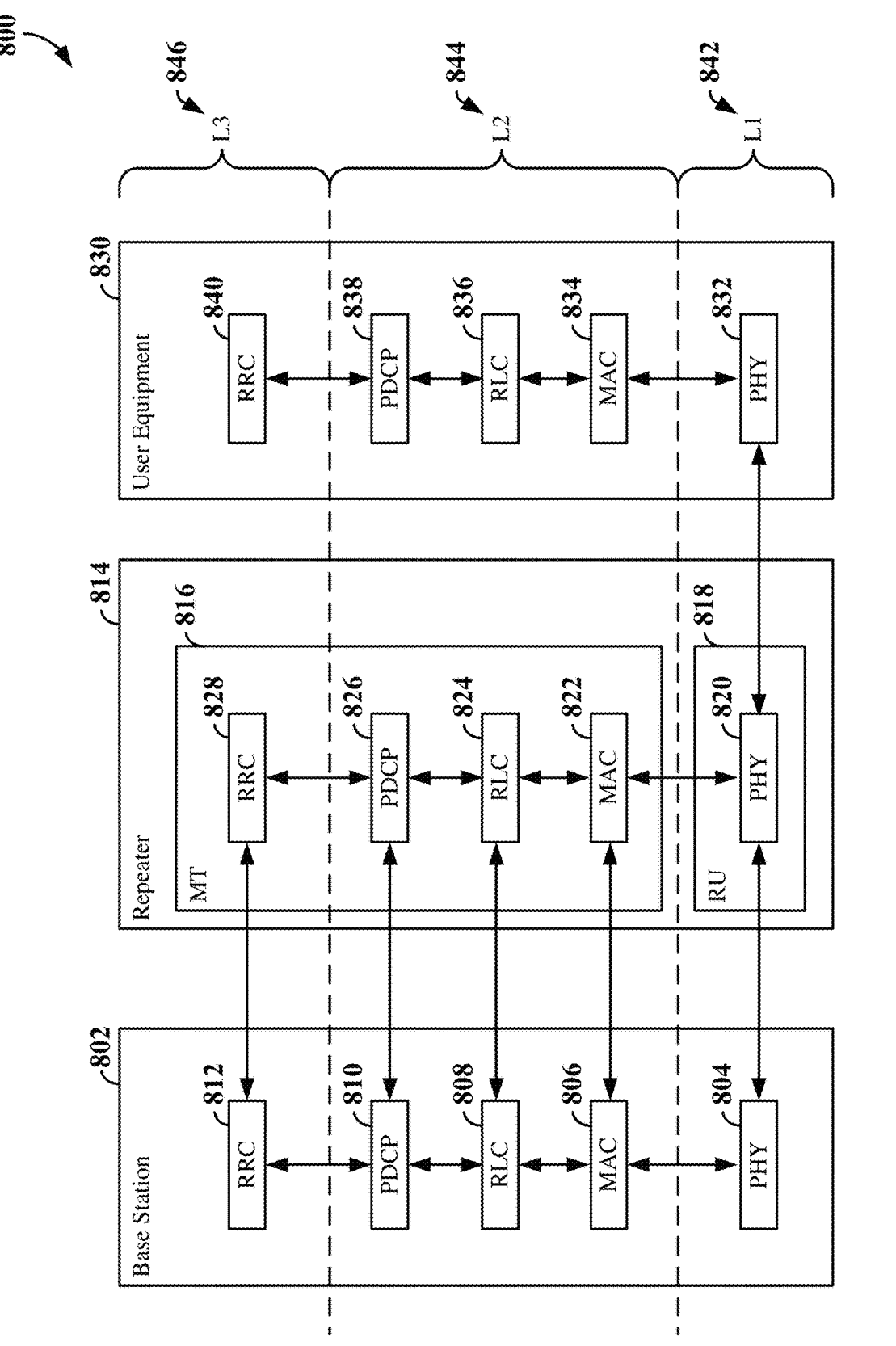
FIG. 8 is a conceptual illustration of protocol layers according to some aspects.

FIG. 8 is a diagram illustrating an example of a radio protocol architecture 800 for a control plane that may be used with a higher-functionality repeater (e.g., the repeater 700 of FIG. 7) according to some aspects of the disclosure. In particular, FIG. 8 depicts a control plane protocol stack for a base station 802, a repeater device 814, and a UE 830. The radio protocol architecture 800 may be for a 5G wireless system in some examples. The base station 802 may correspond to any of the base stations (e.g., gNBs,) or scheduling entities shown in any of FIGS. 1, 2, 4, 5, 9-11, and 14. The UE 830 may be any of the UEs or scheduled entities shown in any of FIGS. 1, 2, 4, 5, 9-11, 14, and 16. The repeater device 814 may be any of the assisting nodes (e.g., repeaters) shown in any of FIGS. 1, 2 and 4-12.

As illustrated in FIG. 8, the radio protocol architecture 800 includes three layers: layer 1 (L1), layer 2 (L2), and layer 3 (L3). L1 842 is the lowest layer, L2 844 is above L1 842, and L3 846 is above L2 844.

With respect to the repeater device 814, an implementation of the protocol stack may be divided between a relay unit (RU) 818 in L1 842 and a mobile termination (MT) 816 in L2 844 and L3 846. In L1 842, the physical layer 820 of the RU 818 may operate as a relay, relaying modulated RF analog signals (e.g., digital content on analog carriers) in the uplink and downlink directions between the physical layer 804 of the base station 802 and the physical layer 832 of the UE 830.

There are at least two types of relay procedures that may be used by the repeater device 814 to relay traffic (e.g., user data signals and control signals) through the repeater device 814 between the base station 802 and the UE 830. A first relay procedure may be referred to as a Layer-1 relay procedure, which may be implemented by a Layer-1 relay. A second relay procedure may be referred to as a Layer-2 relay procedure.

In some examples, the repeater device 814 may be configured as a Layer-1 relay operating according to a Layer-1 relay procedure. When operating as a Layer-1 relay, the repeater device 814 receives a signal as a modulated RF waveform at a receiver coupled to a receive antenna array, amplifies the signal, and retransmits the signal from a transmitter coupled to a transmit antenna array. Therefore, a Layer-1 relay may be referred to as an amplify and forward relay. In general, a Layer-1 relay may not require a great amount of upper level functionality to perform the amplify and forward type function and may be less complex and less costly than a Layer-2 relay.

In some examples, the repeater device 814 may be configured to operate as a Layer-2 relay. When operating as an Layer-2 relay, the repeater device 814 may receive a signal as a modulated RF waveform at receiver coupled to a receive antenna array, demodulate and decode the signal to obtain a digital representation of the signal, re-encode and re-modulate the signal, amplify, and then forward the signal from a transmitter coupled to a transmit antenna array. Therefore, a Layer-2 relay may be referred to as a decode and forward type of relay. In general, a Layer-2 relay is more complex than a Layer-1 relay and may require a greater amount of upper level functionality (in comparison to a Layer-1 relay) to perform the decode and forward type of operation. Therefore, the Layer-2 relay may be more complex and more costly than a Layer-1 relay.

According to some aspects of the disclosure, the repeater device 814 may be configured as, and referred to as, a smart repeater device. The smart repeater device may apply some upper level functionality to a Layer-1 relay but may not provide the level of functionality that would be required to operate as a Layer-2 relay. For example, while the smart repeater device may not use higher level functionality to demodulate, decode, encode, and re-modulate a signal, the smart relay may use higher level functionality to sense channels, implement MIMO functionality, select various beams in conjunction with a use of various synchronization signal block (SSB) information and transmission configuration indicator (TCI) states, and may adjust transmit power of a modulated RF waveform being amplified and forwarded by the Layer-1 relay of the smart repeater device.

The various protocol layers illustrated in FIG. 8 for each of the base station 802, the repeater device 814, and the UE 830 are similar and will be described once to avoid repetition. The layers include the PHY layer 804, 820, 832 at the L1 layer 842, the medium access control (MAC) layer 806, 822, 834, the radio link control (RLC) layer 808, 824, 836, the packet data convergence protocol (PDCP) layer 810, 826, 838 at the L2 layer 844, and the RRC layer 812, 828, 840 at the L3 layer 846.

The physical (PHY) layer 804, 820, 832 may be responsible for transmitting and receiving data on physical channels (e.g., within slots). MAC service data units (SDUs) may be placed in MAC protocol data units (PDUs) for transport over transport channels to the PHY layer 804, 820, 832. A PHY context may indicate a transmission format and a radio resource configuration (e.g., BWP, numerology, etc.). Functions of the PHY layer 804, 820, 832 may include, for example, error detection on transport channels and indications to higher layers, forward error correction encoding/decoding of the transport channels, hybrid automatic repeat request (HARQ) soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, multiple input multiple output (MIMO) antenna processing, transmit diversity, digital and analog beamforming, and RF processing The MAC layer 806, 822, 834 may provide services to upper layers and obtains services from the PHY layer 804, 820, 832. The PHY layer 804, 820, 832 offers transport channels to the MAC layer 806, 822, 834 to support transport services for data transfer over the radio interface. The MAC layer 806, 822, 834 offers logical channels to the RLC layer 808, 824, 836. The logical channels exist between the MAC and PHY layers, while transport channels exist between the PHY and radio layer. Therefore, the MAC layer may be an interface between higher layer logical channels and PHY layer transport channels. The functions of the MAC layer 806, 822, 834 may include, for example, beam management random access procedure, mapping between logical and transport channels, and concatenation of multiple MAC SDUs belonging to one logical channel into a transport block (TB).

The RLC layer 808, 824, 836 may provide segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 808, 824, 836.

The PDCP layer 810, 826, 838 may provide packet sequence numbering, in-order delivery of packets, retransmission of PDCP protocol data units (PDU), and transfer of upper layer data packets to lower layers. PDUs may include, for example, Internet Protocol (IP) packets, Ethernet frames and other unstructured data (e.g., machine-type communication (MTC), hereinafter collectively referred to as "packets"). The PDCP layer 810, 826, 838 may also provide header compression for upper layer data packets to reduce radio transmission overhead, security by ciphering the data packets, and integrity protection of data packets. A PDCP context may indicate whether PDCP duplication is utilized for a unicast connection, for example.

The RRC layer 812, 828, 840 of the L3 layer 846 may be responsible for establishing and configuring signaling radio bearers (SRBs) and data radio bearers (DRBs) between the base station 802 and the UE 830 and/or between the base station 802 and the repeater device 814, paging initiated by the 5GC or NG-RAN, and broadcast of system information related to Access Stratum (AS) and Non Access Stratum (NAS). The RRC layer 812, 828, 840 may further be responsible for QoS management, mobility management (e.g., handover, cell selection, inter-RAT mobility), UE 830 measurement and reporting, and security functions.

In the user plane (not shown), the radio protocol architecture for the base station 802, the repeater device 814, and the UE 830 are substantially similar for the L1 layer 842 and the L2 layer 844 and will not be repeated to avoid repetition. The user plane protocol stack does not include an RRC layer 812, 828, 840. The user plane protocol stack does include, for example, a service data adaptation protocol (SDAP) layer (not shown) in the L3 layer 846. The SDAP layer (not shown) may provide a mapping between a 5G core (5GC) quality of service (QoS) flow and a data radio bearer and performs QoS flow ID marking in both downlink and uplink packets.

The disclosure relates in some aspects to assisting nodes (e.g., repeaters, IRSs, lower-layer relays, digital repeaters, etc.) that are capable of forwarding signals for different types of wireless communication links. For example, an assisting node may forward both Uu signals (e.g., DL and/or UL signals between a gNB and a UE) and PC5 signals (e.g., sidelink signals between two UEs). For example, a repeater may forward Uu signals between a cell, and a first set of one or multiple UEs. In addition, the repeater may forward PC5 signals among a second set of UEs. The first set and the second set of devices may be overlapping or may be disjoint. Uu forwarding can also be extended to multiple cells.

Figure 9:
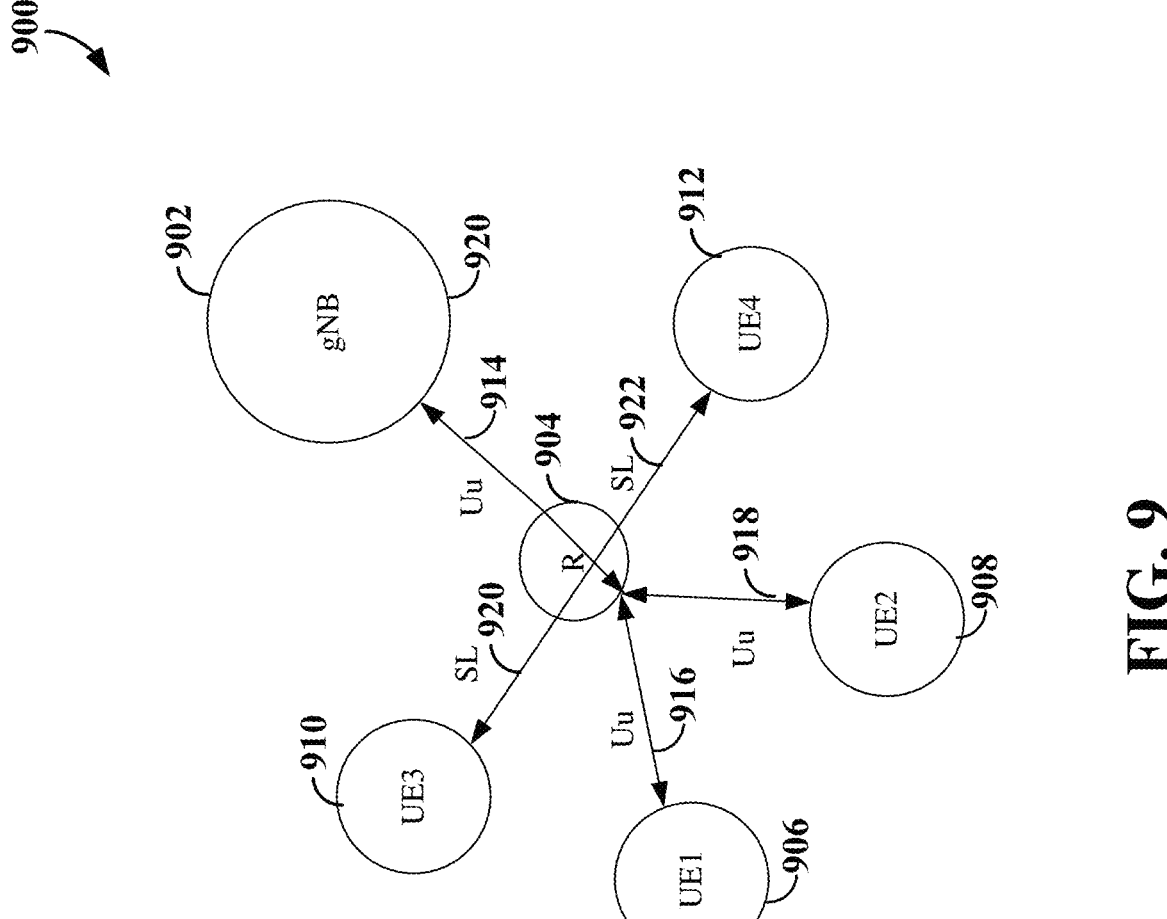
FIG. 9 is a conceptual illustration of an example of an assisting node that forwards signals on different wireless communication links according to some aspects.

FIG. 9 illustrates an example of a wireless communication system 900 that includes a gNB 902, an assisting node (e.g., a repeater) 904, a first UE 906, a second UE 908, a third UE 910, and a fourth UE 912. In this example, the assisting node 904 may forward traffic between the gNB 902 and the first UE 906 via a first Uu link 914 and a second Uu link 916. In addition, the assisting node 904 may forward traffic between the gNB 902 and the second UE 908 via the first Uu link 914 and a third Uu link 918. Furthermore, the assisting node 904 may forward traffic between the third UE 910 and the fourth UE 912 via a first PC5 link 920 and a second PC5 link 922. The gNB 902 may correspond to any of the base stations (e.g., gNBs,) or scheduling entities shown in any of FIGS. 1, 2, 4, 5, 9-11, and 14. The first UE 906, the second UE 908, the third UE 910, and the fourth UE 912 may be any of the UEs or scheduled entities shown in any of FIGS. 1, 2, 4, 5, 9-11, 14, and 16. The assisting node 904 may be any of the assisting nodes (e.g., repeaters) shown in any of FIGS. 1, 2 and 4-12.

In some examples, an assisting node may be agnostic to the type of traffic (e.g., PC5 vs Uu) being forwarded. In this case, the assisting node may simply follow control commands (e.g., from a gNB) to do wideband signal forwarding in upcoming slots.

In other examples, an assisting node may have some limitations as to its forwarding capabilities. In addition, more than one entity may attempt to control the assisting node. Consequently, conflicts may arise as to the repeating operations to be performed by the assisting node. The disclosure relates in some aspects to techniques for dealing with these and other related issues.

The disclosure relates in some aspect to methods of configuration for an assisting node that can forward signals over different types of wireless communication links (e.g., a Uu link and a PC5 link). The assisting node is configured for its forwarding operation, whereby the configuration may refer to any combination of Tx/Rx beams, BW, time resources, power configuration, forwarding direction, Tx/Rx timing references, etc. The method of the repeater's configuration can be based on any combination of a gNB-controlled configuration, a UE-controlled configuration, an autonomously controlled configuration, and a pre-configuration.

An assisting node may adopt the same and/or different methods of configurations for different forwarding operations (e.g., PC5 vs Uu). For example, both PC5 and Uu forwarding operations may be controlled by the same method (e.g., both forwarding operations are controlled by the gNB, controlled by the UE, or controlled autonomously). As another example, a gNB may control the forwarding over the Uu links, but PC5 forwarding operations are controlled by a sidelink UE. Alternatively, one UE (e.g., the first UE 906 of FIG. 9) may control the forwarding over the Uu link, but PC5 forwarding operations are controlled by another UE (e.g., the third UE 910 of FIG. 9).

The disclosure relates in some aspects to signaling and procedures to support forwarding operations over different types of wireless communication links (e.g., a Uu link and a PC5 link). In some examples, there may a prior collaboration (e.g., coordination, negotiation, or some other form of cooperation) among different entities (e.g., any combination of the gNB, the UE(s), and the assisting node) regarding the method of the assisting node's configuration and the associated conditions/restrictions (e.g., limiting one forwarding operation to a set of time/frequency/spatial resources and/or a set of parameters such as power configuration).

Multiplexing between Uu and PC5 forwarding operations may be based on time division multiplexing (non-overlapping time resources), frequency division multiplexing (non-overlapping frequency resources), spatial division multiplexing (overlapping time and frequency resources), or any combination of these multiplexing techniques. A forwarding configuration decision may be based on any combination of an assisting node's capabilities/limitations, collaboration among the different entities (e.g., the gNB, the UEs, and the assisting node), and the PC5 band and the Uu band configurations.

Different assisting nodes may have different capabilities. For example, some assisting nodes may require time division multiplexing (TDMing), possibly with required guard symbols. Some assisting nodes may require frequency division multiplexing (FDMing), possibly with a minimum guard band and/or limited to specific RB set combinations (e.g., depending on implemented filters at the assisting node). Some assisting nodes may support spatial division multiplexing (SDMing), e.g., for specific combinations of Tx and Rx beams.

The capability (and/or the required guard symbols and guard band in case of TDM and FDM respectively) may depend on any one or more of the following: the Tx/Rx time alignment (e.g., if Tx/Rx time alignment is guaranteed, an assisting node may support FDM/SDM); the power configuration (e.g., an assisting node may have some limitation in setting its amplification gain/output Tx power for simultaneous outgoing signals, and/or Rx power limitations for simultaneous incoming signals); the required QoS (e.g., in terms of error vector magnitude (EVM), noise figure, leakage); and the Tx/Rx beamforming configuration. A capability may be cell-specific, SL link specific, UE-specific, or BW-dependent. For a required number of guard symbols, a capability may further depend on the transition type (to/from PC5 from/to Uu) and the associated timing references.

The disclosure relates in some aspects to signaling that enables an assisting node to provide its capabilities (e.g., its limitations) to any combination of gNBs and UEs (e.g., via broadcast, multi-cast, or unicast messages, over Uu, SL, or any other RATs). The acquired information about an assisting node's capabilities (e.g., limitations) may be shared among other nodes (e.g., a gNB may provide this information to a UE, a UE may provide this information to another UE, a UE may provide this information to a gNB, etc.).

The disclosure relates in some aspects to conflict resolution for an assisting node that can forward signals over different types of wireless communication links (e.g., a Uu link and a PC5 link). Conflicts may occur, for example, when there is a limitation of the assisting node, such that the assisting node cannot fulfill the expected (e.g., configured) operations.

Several examples of such conflicts follow. In some examples, an assisting node requires TDMing (and may additionally require guard symbols), but the PC5 and Uu signals to be forwarded may be at least partially overlapping in time. In some examples, an assisting node requires FDMing (and may additionally require guard bands), but the PC5 and Uu signals to be forwarded may be at least partially overlapping in frequency. In some examples, PC5 and Uu signals are associated with beam directions that cannot be simultaneously supported by the assisting node. In some examples, the desired/required power configuration (Tx and/or Rx) for the overlapping Uu and PC5 signals cannot be supported by the assisting node.

In the event a conflict occurs, an assisting node may perform any of the following operations. The assisting node may cancel both conflicting operations. The assisting node may prioritize one operation over the other operation. For example, the deprioritized operation may be canceled, may be partially canceled (e.g., canceled over overlapping resources, while continuing to use non-overlapping resources for the different operations), still be performed but with an adjusted configuration that has one or more of reduced transmit power, adjusted timing, lower communication quality (e.g., a larger EVM, NF, or leakage), or a combination thereof.

The prioritization performed by an assisting node may depend on any combination of the following: PC5 versus Uu (e.g., Uu always has higher priority than PC5), the signal type (e.g., a reference signal (RS), a control channel, and a data channel may have different priorities), the traffic type (e.g., broadcast, multicast, and unicast traffic may have different priorities), the traffic direction (e.g., DL vs UL, where one has a higher priority), the link type (e.g., DL vs UL vs SL, where different links have different priorities), UE-specific priorities, SL-specific priorities, or beam-specific priorities. The prioritization may depend on any combination of time of configuration or scheduling (e.g., a later configuration may have a higher priority than an earlier configuration), time of communication (e.g., an earlier signal may have a higher priority than a later signal), the type of configuration (a semi-static configuration may have a different priority than a dynamic configuration), the method of configuration (e.g., gNB configured versus UE configured versus autonomous configuration, where the different configuration types have different priorities), an explicit priority indication (e.g., which may be provided (e.g., dynamically provided) as part of a configuration or a schedule), the type of resources to be used for the forwarding (e.g., DL, UL, fixed (F), SL slot may have different priorities), or RB/BWP-specific priorities (i.e., over some RB sets and/or BWPs, PC5 may have a higher priority than Uu).

These priorities may be selected in different ways in different examples. In some examples, a hierarchy of access priorities can be defined among different UEs (e.g., by a gNB, by ad-hoc collaboration, or centrally by another control entity). In the case of a UE-specific priority, an assisting node may be provided with information regarding prioritization across different UEs (e.g., a first UE has a first priority level, a second UE has a second priority level, and so on). In the case of an explicit priority indication, an assisting node may not know the priorities a priori, however, each UE may include its priority level in its command to the assisting node. Thus, the assisting node may decide which command to follow based on these priorities.

The disclosure relates in some aspects to signaling for resolving a conflict. In some examples, the resolution of a conflict may be based on one or more prioritization rules. In various examples, the prioritization rules may be preconfigured, negotiated, or indicated by any of the entities involved in the forwarding operations (e.g., a gNB, UEs, a repeater). In the event a conflict occurs and/or a configuration is adjusted, the assisting node may inform the involved entities (e.g., a gNB, and the UEs) of the conflict and/or the configuration adjustment. For example, the assisting node may provide an indication to these entities before or after the originally scheduled operation.

Figure 10:
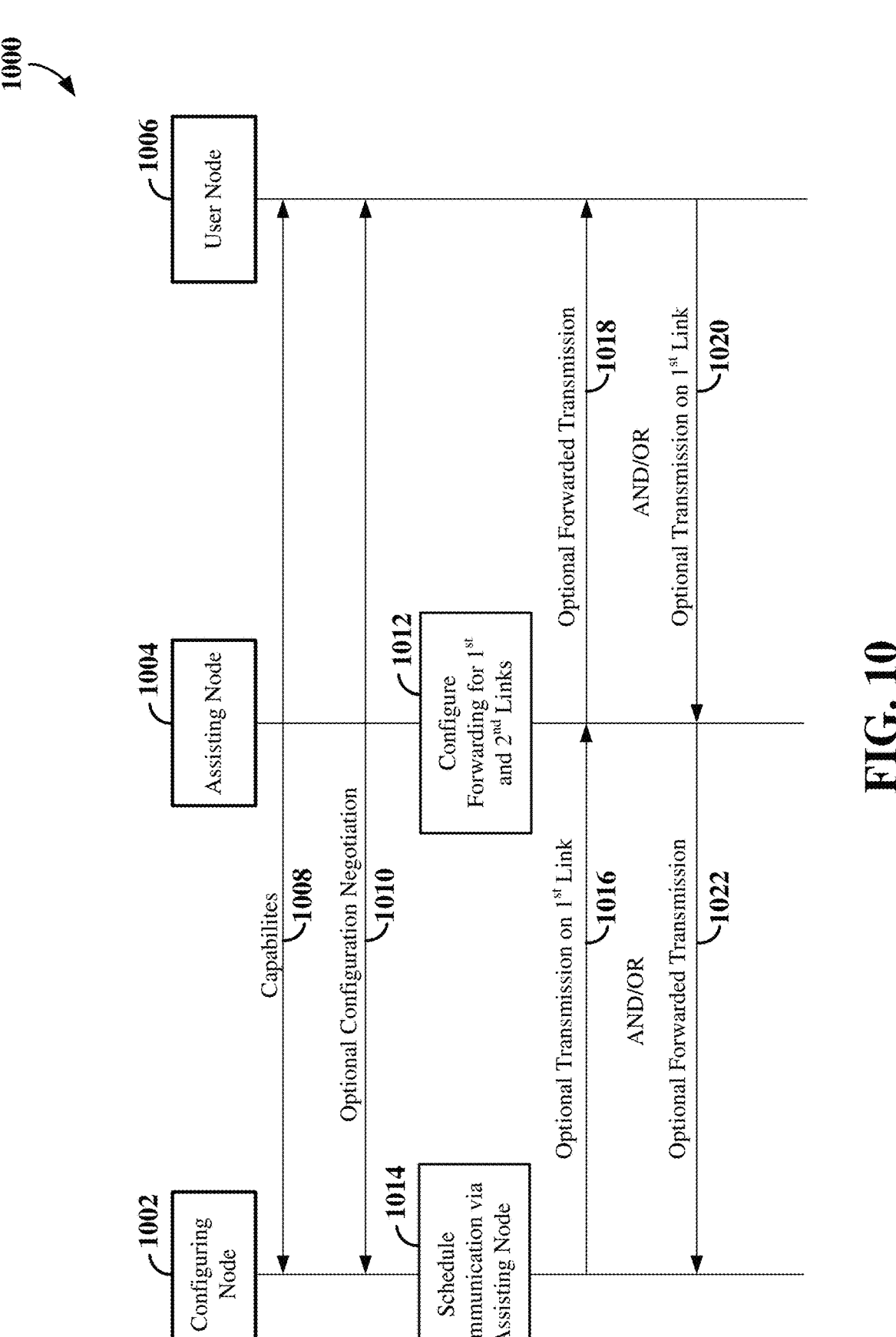
FIG. 10 is a signaling diagram illustrating an example of signaling associated with forwarding signals between nodes according to some aspects.

FIG. 10 is a signaling diagram 1000 illustrating an example of signaling associated with configuration of forwarding operations in a wireless communication system including a configuring node 1002, an assisting node 1004, and a user node 1006. In some examples, the configuring node 1002 may correspond to any of the base stations or scheduling entities shown in any of FIGS. 1, 2, 4, 5, 8, and 9. In some examples, the configuring node 1002 may correspond to any of the UEs, wireless communication devices, or scheduled entities shown in any of FIGS. 1, 2, 4, 5, 8, 9, 11, and 14. In some examples, the user node 1006 may correspond to any of the UEs, wireless communication devices, or scheduled entities shown in any of FIGS. 1, 2, 4, 5, 8, 9, 11, and 16. In some examples, the assisting node 1004 may correspond to any of the assisting nodes shown in any of FIGS. 2, 4, 5, 6, 7, 8, 9, 11, and 12.

At #1008 of FIG. 10, the assisting node 1004 signals its capabilities. In some examples, the assisting node 1004 may signals its capabilities to the configuring node 1002 and/or the user node 1006. In some examples, the configuring node 1002 may forward the corresponding capability information of the assisting node 1004 to the user node 1006 or the user node 1006 may forward the capability information of the assisting node 1004 to the configuring node 1002.

At optional #1010, two or more nodes of the assisting node 1004, the configuring node 1002, or the user node 1006 may negotiate to determine a configuration for forwarding operations on different wireless communication links. For example, as discussed above, the forwarding on different links may be configured to use TDM, FDM, or SDM. As another example, guard symbols and/or guard bands may be configured. As a further example, the resources (e.g., RBs) and/or transmit power to be used for the different forwarding operations may be configured. Other configuration parameters may be negotiated as well.

In some examples, the assisting node 1004 may determine that a forwarding configuration (e.g., specified by the configuring node 1002) results in a conflict. In this case, the assisting node 1004 may change the configuration and/or send a message indicating the conflict and/or the change in the configuration.

At #1012, the assisting node 1004 configures its forwarding operations for a first wireless communication link (e.g., a Uu link) and a second wireless communication link (e.g., a PC5 link). In some examples, this configuration may be based on the negotiation of #1010.

At #1014, the configuring node 1002 schedules a communication via the assisting node 1004. For example, the configuring node 1002 may schedule the resources (e.g., downlink slots) and transmission parameters (e.g., MCS, etc.) to be used for a transmission from the configuring node 1002 to the user node 1006 via the assisting node 1004. As another example, the configuring node 1002 may schedule the resources (e.g., uplink slots) and transmission parameters (e.g., MCS, etc.) to be used for a transmission from the user node 1006 to the configuring node 1002 via the assisting node 1004.

At optional #1016, the configuring node 1002 may transmit a transmission on the first link. For example, the configuring node 1002 may transmit a downlink transmission on resources scheduled at 1014.

At optional #1018, the assisting node 1004 forwards the transmission of #1016 to the user node 1006. In some examples, the assisting node 1004 simply repeats the analog RF signals that it receives from the configuring node 1002. In some examples, the assisting node 1004 may decode and forward the transmission that it receives from the configuring node 1002.

At optional #1020, the user node 1006 may transmit a transmission on the first link. For example, the user node 1006 may transmit an uplink transmission on resources scheduled at 1014.

At optional #1022, the assisting node 1004 forwards the transmission of #1020 to the configuring node 1002. In some examples, the assisting node 1004 simply repeats the analog RF signals that it receives from the user node 1006. In some examples, the assisting node 1004 may decode and forward the transmission that it receives from the user node 1006.

Figure 11:
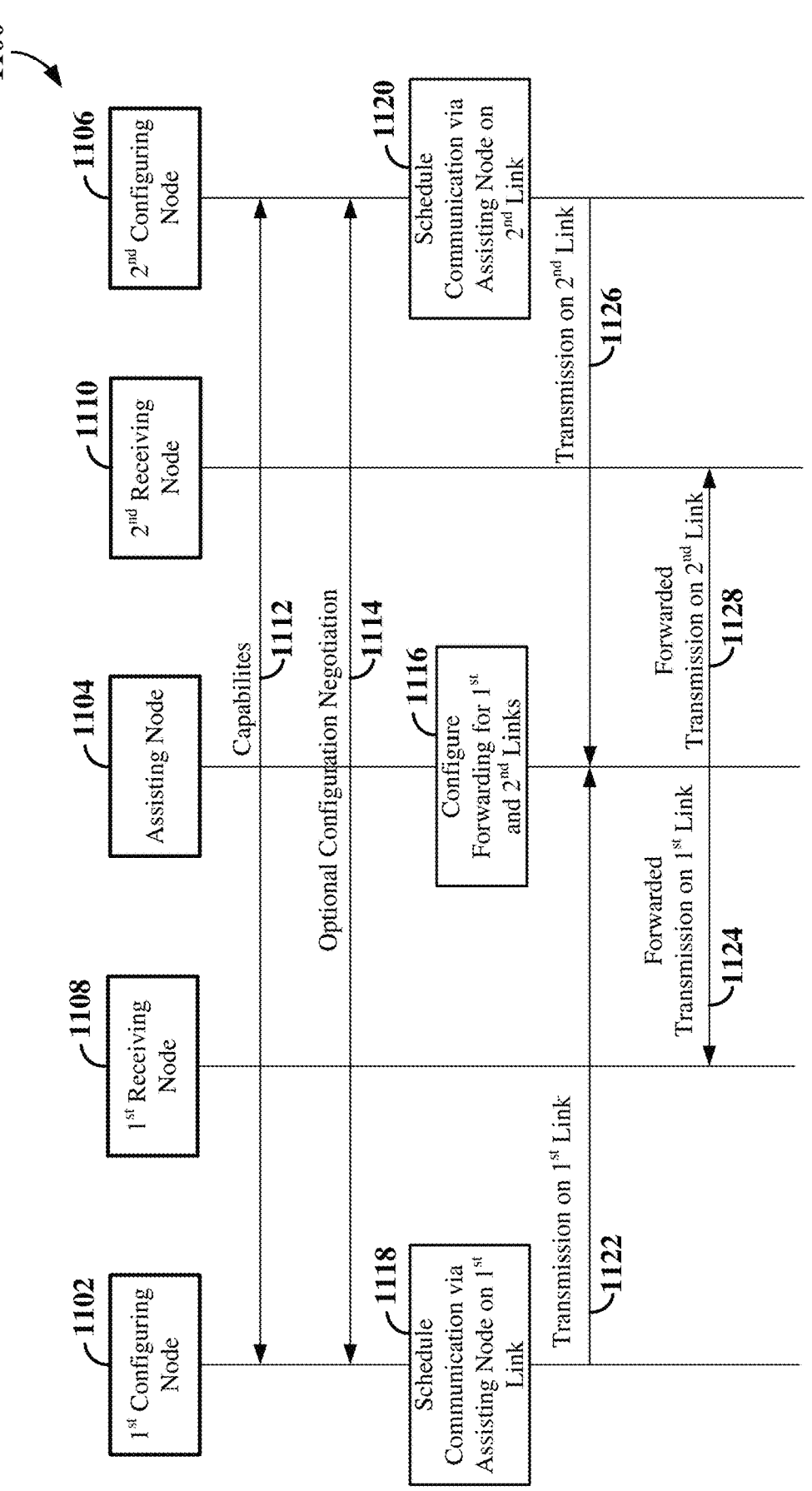
FIG. 11 is a signaling diagram illustrating an example of signaling associated with forwarding signals on different wireless communication links according to some aspects.

FIG. 11 is a signaling diagram 1100 illustrating an example of signaling associated with forwarding operations in a wireless communication system including a first configuring node 1102, an assisting node 1104, a second configuring node 1106, a first receiving node 1108, and a second receiving node 1110. In some examples, the first configuring node 1102 and the second configuring node 1106 may correspond to any of the base stations or scheduling entities shown in any of FIGS. 1, 2, 4, 5, 8, and 9. In some examples, the first configuring node 1102 and the second configuring node 1106 may correspond to any of the UEs, wireless communication devices, or scheduled entities shown in any of FIGS. 1, 2, 4, 5, 8, 9, 10, and 14. In some examples, the first receiving node 1108 and the second receiving node 1110 may correspond to any of the UEs or scheduled entities shown in any of FIGS. 1, 2, 4, 5, 8, 9, 10, and 16. In some examples, the assisting node 1104 may correspond to any of the assisting nodes shown in any of FIGS. 2, 4, 5, 6, 7, 8, 9, 10, and 12.

At #1112 of FIG. 11, the assisting node 1104 signals its capabilities. In some examples, the assisting node 1104 may signals its capabilities to one or more of the first configuring node 1102, the second configuring node 1106, the first receiving node 1108, or the second receiving node 1110. In some examples, upon receiving capability information of the assisting node 1104, any one or more of the nodes of FIG. 11 may forward the capability information to at least one other node. For example, the first configuring node 1102 may forward the capability information of the assisting node 1104 to the first receiving node 1108 and/or to the second configuring node 1106. As another example, the second configuring node 1106 may forward the capability information of the assisting node 1104 to the second receiving node 1110 and/or to the first configuring node 1102.

At optional #1114, two or more nodes of the assisting node 1104, the first configuring node 1102, the second configuring node 1106, the first receiving node 1108, or the second receiving node 1110 may negotiate to determine a configuration for forwarding operations on different wireless communication links. For example, as discussed above, the forwarding on different links may be configured to use TDM, FDM, or SDM. As another example, guard symbols and/or guard bands may be configured. As a further example, the resources (e.g., RBs) and/or transmit power to be used for the different forwarding operations may be configured. Other configuration parameters may be negotiated as well.

In some examples, the assisting node 1104 may determine that a forwarding configuration (e.g., specified by the first configuring node 1102 and/or the second configuring node 1106) results in a conflict. In this case, the assisting node 1104 may change the configuration and/or change one or both of the forwarding operations. In addition, the assisting node 1104 may send a message (e.g., to the first configuring node 1102 and/or the second configuring node 1106) indicating the conflict and/or any changes made by the assisting node 1104.

At #1116, the assisting node 1104 configures its forwarding operations for a first wireless communication link (e.g., a Uu link) and a second wireless communication link (e.g., a PC5 link). For example, the assisting node 1104 may configure a first forwarding operation from the first configuring node 1102 to the first receiving node 1108 over the first wireless communication link. In addition, the assisting node 1104 may configure a second forwarding operation from the second configuring node 1106 to the second receiving node 1110 over the second wireless communication link. In some examples, this configuration may be based on the negotiation of #1114.

At #1118, the first configuring node 1102 schedules a communication via the assisting node 1104 on the first wireless communication link. For example, the first configuring node 1102 may schedule the resources (e.g., downlink slots) and transmission parameters (e.g., MCS, etc.) to be used for a transmission from the first configuring node 1102 to the first receiving node 1108 via the assisting node 1104.

At #1120, the second configuring node 1106 schedules a communication via the assisting node 1104 on the second wireless communication link. For example, the second configuring node 1106 may schedule the resources (e.g., allocated sidelink slots) and transmission parameters (e.g., MCS, etc.) to be used for a sidelink transmission from the second configuring node 1106 to the second receiving node 1110 via the assisting node 1104.

At #1122, the first configuring node 1102 transmits a transmission on the first wireless communication link. For example, the first configuring node 1102 may transmit a downlink transmission on resources scheduled at #1118.

At #1124, the assisting node 1104 forwards the transmission of #1122 to the first receiving node 1108. In some examples, the assisting node 1104 simply repeats the analog RF signals that it receives from the first configuring node 1102. In some examples, the assisting node 1104 may decode and forward the transmission that it receives from the first configuring node 1102.

At #1126, the second configuring node 1106 transmits a transmission on the second wireless communication link. For example, the second configuring node 1106 may transmit a sidelink transmission on resources scheduled at #1120.

At #1124, the assisting node 1104 forwards the transmission of #1126 to the second receiving node 1110. In some examples, the assisting node 1104 simply repeats the analog RF signals that it receives from the second configuring node 1106. In some examples, the assisting node 1104 may decode and forward the transmission that it receives from the second configuring node 1106.

As discussed above, the assisting node 1104 may forward the transmissions on the first wireless communication link and the second wireless communication link using TDM, FDM, or SDM in some examples. In accordance with the teachings herein, the assisting node 1104 may be configured (e.g., at #1114 and #1116) to effectively handle both of these forwarding operations. In addition, the assisting node 1104 may be configured to handle any conflicts that may arise due to this configuration and/or the scheduling by the first configuring node 1102 and/or the second configuring node 1106.

Figure 12:
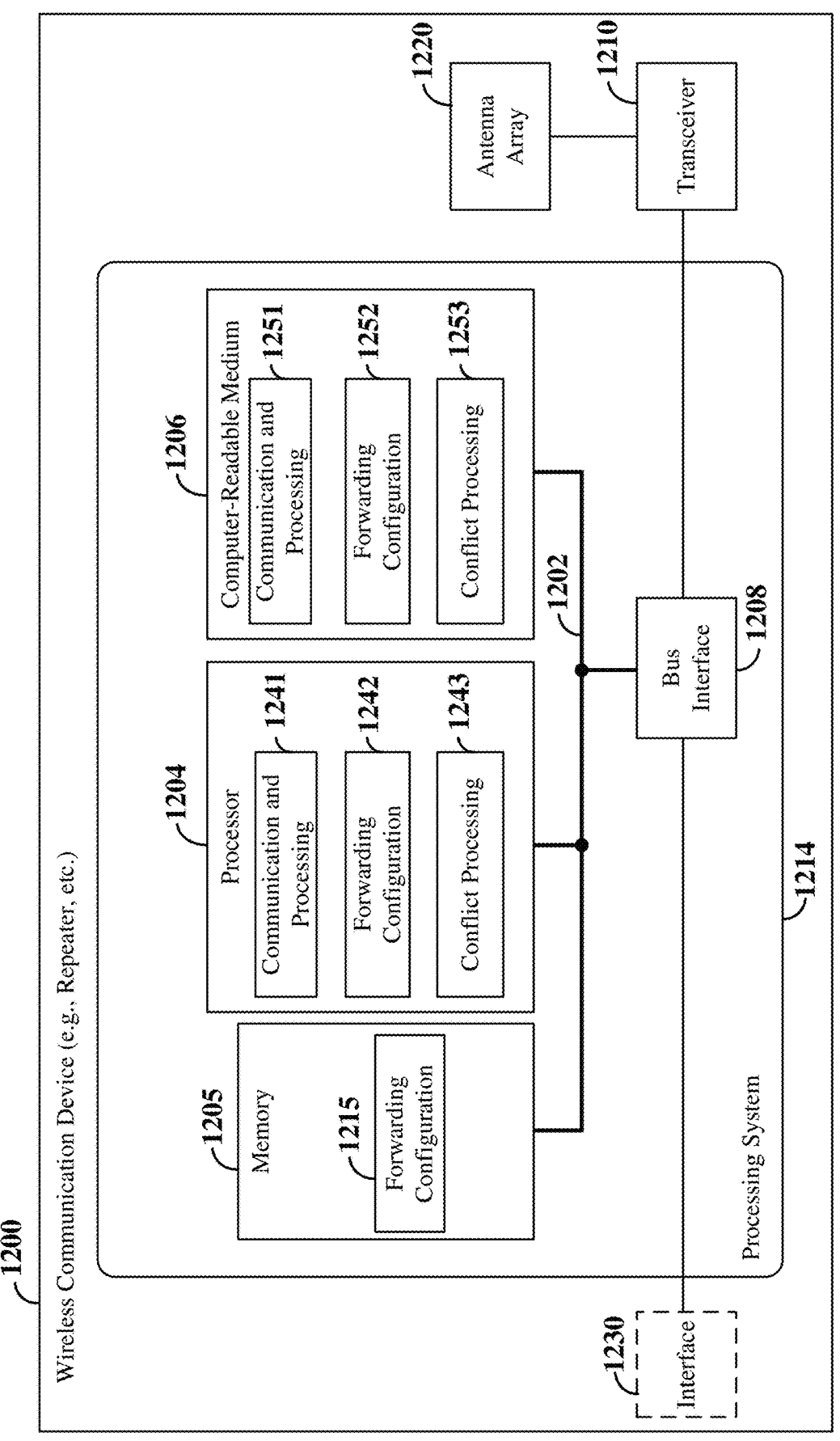
FIG. 12 is a block diagram conceptually illustrating an example of a hardware implementation for a wireless communication device (e.g., a repeater) employing a processing system according to some aspects.

FIG. 12 is a block diagram illustrating an example of a hardware implementation for a wireless communication device 1200 employing a processing system 1214. In some examples, the wireless communication device 1200 may be a UE or scheduled entity configured to wirelessly communicate with a network node, base station, or scheduling entity, as discussed in any one or more of FIGS. 1-11. In some examples, the wireless communication device 1200 may correspond to any of the relay devices, UEs, sidelink devices, D2D devices, RUs, or scheduled entities shown in any of FIGS. 1, 2, and 4-11.

In accordance with various aspects of the disclosure, an element, or any portion of an element, or any combination of elements may be implemented with the processing system 1214. The processing system 1214 may include one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in an wireless communication device 1200, may be used to implement any one or more of the processes and procedures described herein.

The processor 1204 may in some instances be implemented via a baseband or modem chip and in other implementations, the processor 1204 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202, a transceiver 1210 and an antenna array 1220 and between the bus 1202 and an interface 1230. The transceiver 1210 provides a communication interface or means for communicating with various other apparatus over a wireless transmission medium. The interface 1230 provides a communication interface or means of communicating with various other apparatuses and devices (e.g., other devices housed within the same apparatus as the wireless communication device or other external apparatuses) over an internal bus or external transmission medium, such as an Ethernet cable. Depending upon the nature of the wireless communication device 1200, the interface 1230 may include a user interface (e.g., keypad, display, speaker, microphone, joystick). Of course, such a user interface is optional, and may be omitted in some examples, such as an IoT device.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software. For example, the memory 1205 may store forwarding configuration information 1215 used by the processor 1204 for the forwarding-related operations described herein.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The wireless communication device 1200 may be configured to perform any one or more of the operations described herein (e.g., as described above in conjunction with FIGS. 1-11 and as described below in conjunction with FIG. 13). In some aspects of the disclosure, the processor 1204, as utilized in the wireless communication device 1200, may include circuitry configured for various functions.

The processor 1204 may include communication and processing circuitry 1241. The communication and processing circuitry 1241 may be configured to communicate with a scheduling entity, such as a gNB. The communication and processing circuitry 1241 may be configured to communicate with a network node (e.g., a base station) and one or more other wireless communication devices over a common carrier shared between a cellular (e.g., Uu) interface and a sidelink (e.g., PC5) interface. The communication and processing circuitry 1241 may be configured to communicate with one or more other wireless communication devices over a cellular (e.g., Uu) interface and/or a sidelink (e.g., PC5) interface. The communication and processing circuitry 1241 may include one or more hardware components that provide the physical structure that performs various processes related to wireless communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. In some examples, the communication and processing circuitry 1241 may include two or more transmit/receive chains (e.g., one chain to communicate with a base station and another chain to communicate with a sidelink device, or one chain to communicate with a first UE and another chain to communicate with another UE, etc.). The communication and processing circuitry 1241 may further be configured to execute communication and processing software 1251 included on the computer-readable medium 1206 to implement one or more functions described herein.

In examples where the wireless communication device 1200 is a relay wireless communication device, the communication and processing circuitry 1241 may forward data received from a first wireless communication device to a second wireless communication device in accordance with a forwarding configuration. For example, the communication and processing circuitry 1241 may forward data received from a first wireless communication device via a Uu link to a second wireless communication device via a Uu link. In addition, the communication and processing circuitry 1241 may forward data received from a third wireless communication device via a PC5 link to a fourth wireless communication device via a PC5 link.

In some implementations where the communication involves receiving information, the communication and processing circuitry 1241 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may receive one or more of signals, messages, SCIs, feedback, other information, or any combination thereof. In some examples, the communication and processing circuitry 1241 may receive information via one or more of a PSCCH, a PSSCH, a PSFCH, some other type of channel, or any combination thereof. In some examples, the communication and processing circuitry 1241 may include functionality for a means for receiving. In some examples, the communication and processing circuitry 1241 may include functionality for a means for decoding.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may send one or more of signals, messages, SCIs, feedback, other information, or any combination thereof. In some examples, the communication and processing circuitry 1241 may send information via one or more of a PSCCH, a PSSCH, a PSFCH, some other type of channel, or any combination thereof. In some examples, the communication and processing circuitry 1241 may include functionality for a means for sending (e.g., a means for transmitting). In some examples, the communication and processing circuitry 1241 may include functionality for a means for encoding.

The processor 1204 may include forwarding configuration circuitry 1242 configured to perform forwarding configuration-related operations as discussed herein (e.g., one or more of the operations described in conjunction with FIGS. 4-11). The forwarding configuration circuitry 1242 may be configured to execute forwarding configuration software 1252 included on the computer-readable medium 1206 to implement one or more functions described herein.

The forwarding configuration circuitry 1242 may include functionality for a means for receiving signals for a first type of wireless communication link (e.g., as described above in conjunction with FIGS. 9-11). For example, the forwarding configuration circuitry 1242 may be configured to monitor resources specified for a first forwarding operation (e.g., on a Uu link).

The forwarding configuration circuitry 1242 may include functionality for a means for receiving signals for a second type of wireless communication link (e.g., as described above in conjunction with FIGS. 9-11). For example, the forwarding configuration circuitry 1242 may be configured to monitor resources specified for a second forwarding operation (e.g., on a PC5 link).

The forwarding configuration circuitry 1242 may include functionality for a means for forwarding signals (e.g., as described above in conjunction with FIGS. 9-11). For example, the forwarding configuration circuitry 1242 may be configured to forward signals for a first wireless communication link (e.g., on a Uu link) and forward signals for a second wireless communication link (e.g., on a PC5 link). In addition, this forwarding may be performed according to a forwarding configuration that the wireless communication device 1200 received from at least one other device, negotiated with at least one other device, autonomously determined, or was preconfigured with.

The processor 1204 may include conflict processing circuitry 1243 configured to perform conflict processing-related operations as discussed herein (e.g., one or more of the operations described in conjunction with FIGS. 4-11). The conflict processing circuitry 1243 may be configured to execute conflict processing software 1253 included on the computer-readable medium 1206 to implement one or more functions described herein.

The conflict processing circuitry 1243 may include functionality for a means for identifying a conflict (e.g., as described above in conjunction with FIGS. 9-11). For example, the conflict processing circuitry 1243 may be configured to compare a forwarding configuration with the capabilities of the wireless communication to determine whether the forwarding configuration is in conflict with the capabilities. The conflict processing circuitry 1243 may also be configured to take appropriate action (e.g., send a message, change a forwarding operation, etc.) in the event there is a conflict.

Figure 13:
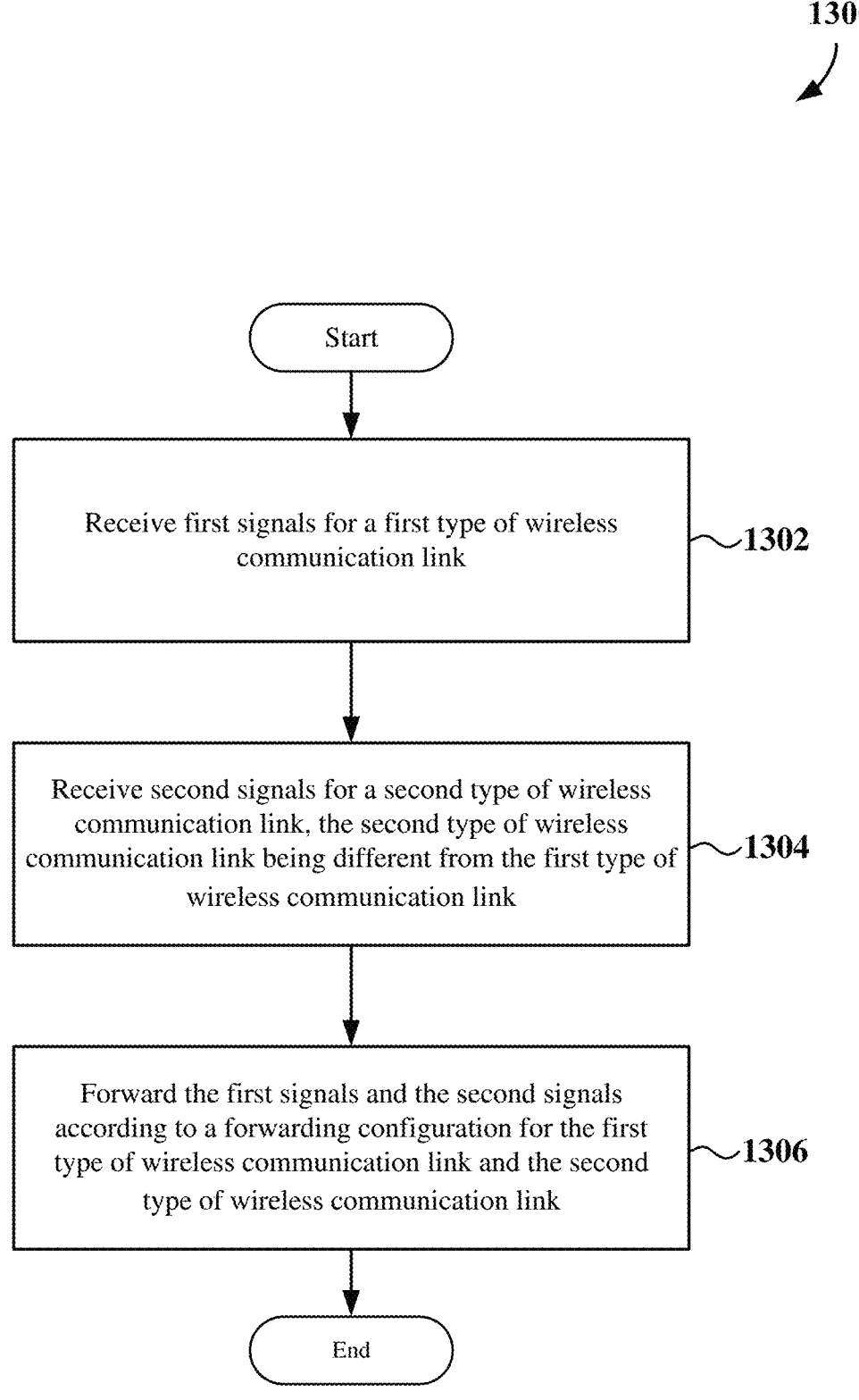
FIG. 13 is a flow chart illustrating an example wireless communication method relating to forwarding signals according to some aspects.

FIG. 13 is a flow chart illustrating an example method 1300 for wireless communication in accordance with some aspects of the present disclosure. As described below, some or all illustrated features may be omitted in a particular implementation within the scope of the present disclosure, and some illustrated features may not be required for implementation of all examples. In some examples, the method 1300 may be carried out by the wireless communication device 1200 illustrated in FIG. 12. In some examples, the method 1300 may be carried out by any suitable apparatus or means for carrying out the functions or algorithm described below.

At block 1302, a first wireless communication device may receive first signals for a first type of wireless communication link. In some examples, the forwarding configuration circuitry 1242 together with the communication and processing circuitry 1241 and the transceiver 1210, shown and described in FIG. 12, may provide a means to receive first signals for a first type of wireless communication link.

At block 1304, the first wireless communication device may receive second signals for a second type of wireless communication link, the second type of wireless communication link being different from the first type of wireless communication link. In some examples, the forwarding configuration circuitry 1242 together with the communication and processing circuitry 1241 and the transceiver 1210, shown and described in FIG. 12, may provide a means to receive second signals for a second type of wireless communication link.

At block 1306, the first wireless communication device may forward the first signals and the second signals according to a forwarding configuration for the first type of wireless communication link and the second type of wireless communication link. In some examples, the forwarding configuration circuitry 1242 in cooperation with the communication and processing circuitry 1241 and the transceiver 1210, shown and described in FIG. 12, may provide a means to forward the first signals and the second signals according to a forwarding configuration for the first type of wireless communication link and the second type of wireless communication link.

In some examples, the first type of wireless communication link is a Uu link. In some examples, the second type of wireless communication link is a PC5 link.

In some examples, the first wireless communication device may transmit forwarding capability information of the first wireless communication device (e.g., to at least one second wireless communication device). In some examples, the first wireless communication device may transmit the forwarding capability information of the first wireless communication device via at least one of broadcast signaling, multicast signaling, unicast signaling, first signaling on the first type of wireless communication link, second signaling on the second type of wireless communication link, or a combination thereof.

In some examples, the forwarding capability information may include at least one of a time division multiplexing requirement, a frequency division multiplexing requirement, a spatial division multiplexing capability, or a combination thereof. In some examples, the forwarding capability information may include at least one of a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

In some examples, the first wireless communication device may receive the forwarding configuration. In some examples, the first wireless communication device may collaborate with at least one second wireless communication device to determine the forwarding configuration. In some examples, the first wireless communication device may determine the forwarding configuration based on at least one of forwarding capability information of the first wireless communication device, a first configuration of the first type of wireless communication link, a second configuration of the second type of wireless communication link, or a combination thereof. In some examples, the at least one second wireless communication device may include at least one of a network node (e.g., a base station, a DU, a CU, etc.) associated with the first type of wireless communication link, a first user equipment associated with the first type of wireless communication link, a second user equipment associated with the second type of wireless communication link, or a combination thereof.

In some examples, the first wireless communication device may receive the forwarding configuration from at least one of a network node (e.g., a base station, a DU, a CU, etc.) associated with the first type of wireless communication link, a user equipment associated with the second type of wireless communication link, or a combination thereof. In some examples, the forwarding configuration specifies a forwarding method for the first type of wireless communication link and the second type of wireless communication link.

In some examples, the forwarding configuration specifies a first forwarding configuration for the first type of wireless communication link and a second forwarding configuration for the second type of wireless communication link. In some examples, the first wireless communication device may receive the first forwarding configuration from a network node (e.g., a base station, a DU, a CU, etc.) associated with the first type of wireless communication link. In some examples, the first wireless communication device may receive the second forwarding configuration from a user equipment associated with the second type of wireless communication link. In some examples, the first wireless communication device may receive the first forwarding configuration from a first user equipment associated with the first type of wireless communication link. In some examples, the first wireless communication device may receive the second forwarding configuration from a second user equipment associated with the second type of wireless communication link.

In some examples, the first wireless communication device may identify a conflict in the forwarding configuration. In some examples, the first wireless communication device may modify a forwarding operation based on the conflict. In some examples, the forwarding operation is associated with the forwarding of the first signals and the second signals. In some examples, the first wireless communication device may transmit an indication of the conflict to a second wireless communication device associated with the first type of wireless communication link, to a third wireless communication device associated with the second type of wireless communication link, or to the second wireless communication device and the third wireless communication device. In some examples, the first wireless communication device may cancel a first forwarding operation configured for the first type of wireless communication link and cancel a second forwarding operation configured for the second type of wireless communication link. In some examples, the first wireless communication device may prioritize a first forwarding operation configured for the first type of wireless communication link over a second forwarding operation configured for the second type of wireless communication link.

In some examples, the first wireless communication device may prioritize the first forwarding operation over the second forwarding operation based on at least one prioritization rule. In some examples, the at least one prioritization rule is preconfigured into the first wireless communication device, received from a second wireless communication device associated with the first type of wireless communication link, received from a third wireless communication device associated with the second type of wireless communication link, or collaborated between at least two of the first wireless communication device, the second wireless communication device, and the third wireless communication device.

In some examples, the first wireless communication device may receive priority information. In some examples, the first wireless communication device may prioritize the first forwarding operation over the second forwarding operation based on the priority information. In some examples, the priority information may include a hierarchy of access priorities for a plurality of user equipment. In some examples, the priority information may include a first priority indication received from a second wireless communication device associated with the first type of wireless communication link and a second priority indication received from a third wireless communication device associated with the second type of wireless communication link. In some examples, the first wireless communication device may prioritize the first forwarding operation over the second forwarding operation based on the first priority indication and the second priority indication.

In some examples, the first wireless communication device may prioritize the first forwarding operation over the second forwarding operation based on at least one of the first type of wireless communication link, the second type of wireless communication link, a first priority of the first type of wireless communication link, a second priority of the second type of wireless communication link, a first type of signal carried by the first type of wireless communication link, a second type of signal carried by the second type of wireless communication link, a first type of transmission on the first type of wireless communication link, a second type of transmission on the second type of wireless communication link, a first direction of traffic on the first type of wireless communication link, a second direction of traffic on the second type of wireless communication link, a first priority of a first user equipment associated with the first type of wireless communication link, a second priority of a second user equipment associated with the first type of wireless communication link, a first beam associated with the first type of wireless communication link, a second beam associated with the second type of wireless communication link, a first time associated with the forwarding configuration for the first type of wireless communication link and the second type of wireless communication link, a second time associated with the forwarding of the first signals and the second signals, a first type of a first forwarding configuration associated with the first type of wireless communication link, a second type of a second forwarding configuration associated with the second type of wireless communication link, a first method of configuration associated with the first type of wireless communication link, a second method of configuration associated with the second type of wireless communication link, a first type of a resource associated with the first type of wireless communication link, a second type of a resource associated with the second type of wireless communication link, a first bandwidth associated with the first type of wireless communication link, a second bandwidth associated with the second type of wireless communication link, an explicit priority indication, or a combination thereof.

In some examples, the first wireless communication device may maintain a first forwarding operation configured for the first type of wireless communication link and cancel a second forwarding operation configured for the second type of wireless communication link. In some examples, the first wireless communication device may maintain a first forwarding operation configured for the first type of wireless communication link and partially cancel a second forwarding operation configured for the second type of wireless communication link. In some examples, the first wireless communication device may maintain a first forwarding operation configured for the first type of wireless communication link and reconfigure a second forwarding operation configured for the second type of wireless communication link.

In some examples, the first wireless communication device is a repeater, a relay, or a reflector.

In one configuration, the wireless communication device 1200 includes means for receiving first signals for a first type of wireless communication link, mean for receiving second signals for a second type of wireless communication link, and means for forwarding the first signals and the second signals according to a forwarding configuration for the first type of wireless communication link and the second type of wireless communication link. In one aspect, the aforementioned means may be the processor 1204 shown in FIG. 12 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable medium 1206, or any other suitable apparatus or means described in any one or more of FIGS. 1, 2, 4, 5, and 6-12, and utilizing, for example, the methods and/or algorithms described herein in relation to FIG. 13.

Figure 14:
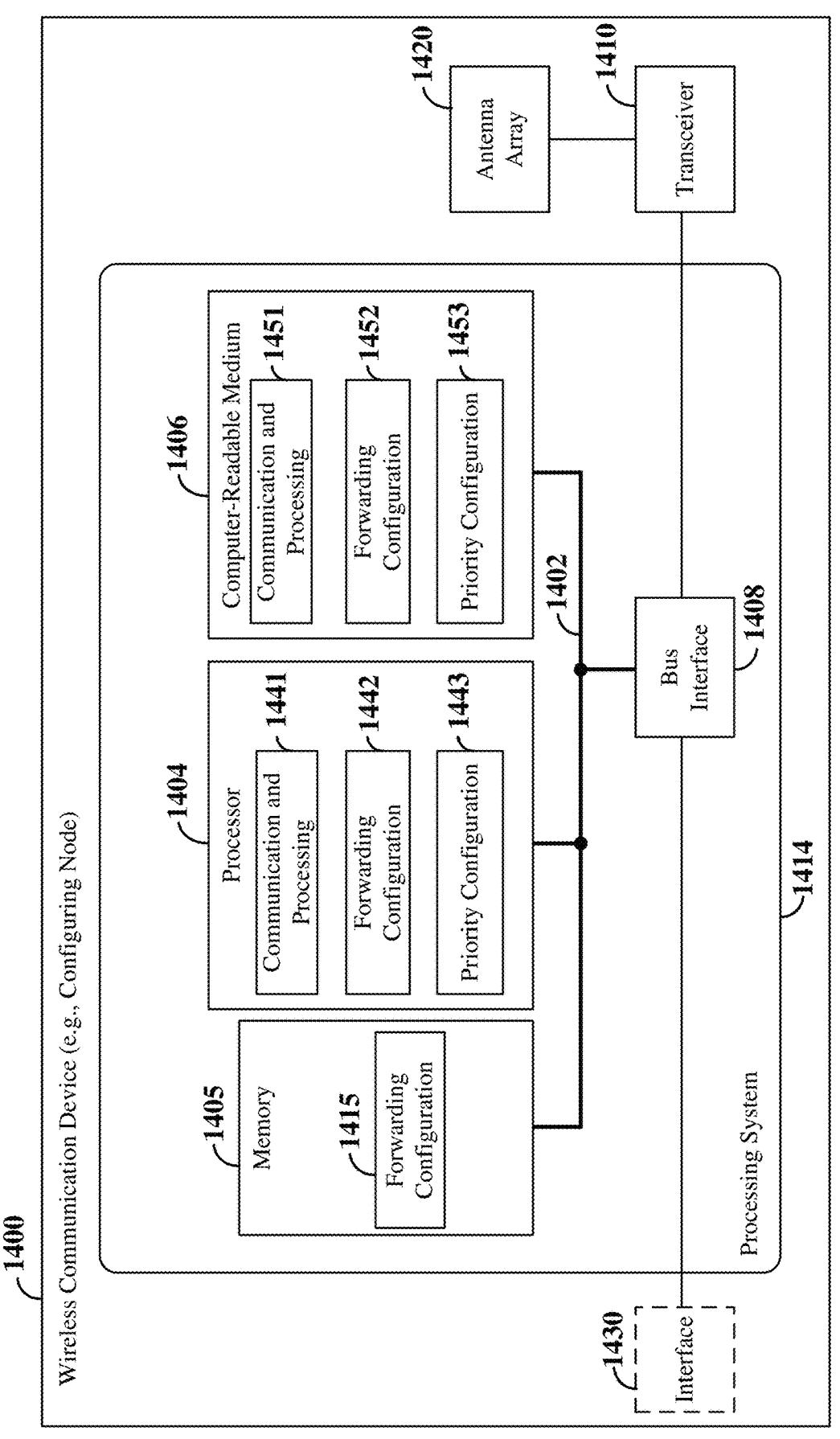
FIG. 14 is a block diagram conceptually illustrating an example of a hardware implementation for a wireless communication device (e.g., a configuring node) employing a processing system according to some aspects.

FIG. 14 is a conceptual diagram illustrating an example of a hardware implementation for a wireless communication device 1400 employing a processing system 1414. In some implementations, the wireless communication device 1400 may correspond to any of the network nodes, base stations (e.g., gNBs), scheduling entities, UEs, scheduled entities, CUs, or DUs, shown in any of FIGS. 1, 2, 4, 5, 8, 9, 10, and 11.

In accordance with various aspects of the disclosure, an element, or any portion of an element, or any combination of elements may be implemented with the processing system 1414. The processing system may include one or more processors 1404. The processing system 1414 may be substantially the same as the processing system 1214 illustrated in FIG. 12, including a bus interface 1408, a bus 1402, memory 1405, a processor 1404, a computer-readable medium 1406, a transceiver 1410, and an antenna array 1420. The memory 1405 may store forwarding configuration information 1415 used by the processor 1404 in cooperation with the transceiver 1410 for the forwarding-related operations described herein. Furthermore, the wireless communication device 1400 may include an interface 1430 (e.g., a network interface) that provides a means for communicating with at least one other apparatus within a core network and with at least one radio access network.

The wireless communication device 1400 may be configured to perform any one or more of the operations described herein (e.g., as described above in conjunction with FIGS. 1-11 and as described below in conjunction with FIG. 15). In some aspects of the disclosure, the processor 1404, as utilized in the wireless communication device 1400, may include circuitry configured for various functions.

In examples where the wireless communication device 1400 is implemented as a scheduling entity (e.g., a gNB, a CU, a DU, etc.), the processor 1404 may be configured to generate, schedule, and modify a resource assignment or grant of time-frequency resources (e.g., a set of one or more resource elements). For example, the processor 1404 may schedule time-frequency resources within a plurality of time division duplex (TDD) and/or frequency division duplex (FDD) subframes, slots, and/or mini-slots to carry user data traffic and/or control information to and/or from multiple scheduled entities. The processor 1404 may be configured to schedule resources for the transmission of downlink signals. The processor 1404 may further be configured to schedule resources for the transmission of uplink signals.

In examples where the wireless communication device 1400 is implemented as a scheduled entity (e.g., a UE, an RU, etc.), the processor 1404 may be implemented via a baseband or modem chip and in other implementations, the processor 1404 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In some aspects of the disclosure, the processor 1404 may include communication and processing circuitry 1441. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In examples where the wireless communication device 1400 is implemented as a scheduling entity, the communication and processing circuitry 1441 may further be configured to receive an indication from a scheduled entity (e.g., a UE). For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1441 may further be configured to receive a scheduling request from a scheduled entity for an uplink grant or a sidelink grant.

In examples where the wireless communication device 1400 is implemented as a scheduled entity, the communication and processing circuitry 1441 may further be configured to may be configured to communicate with a scheduling entity (e.g., a network node, such as a base station). The communication and processing circuitry 1441 may be configured to communicate with a base station and one or more other wireless communication devices over a common carrier shared between a cellular (e.g., Uu) interface and a sidelink (e.g., PC5) interface. The communication and processing circuitry 1441 may include one or more hardware components that provide the physical structure that performs various processes related to wireless communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. In some examples, the communication and processing circuitry 1441 may include two or more transmit/receive chains (e.g., one chain to communicate with a base station and another chain to communicate with a sidelink device). The communication and processing circuitry 1441 may further be configured to execute communication and processing software 1451 included on the computer-readable medium 1406 to implement one or more functions described herein.

In some implementations wherein the communication involves receiving information, the communication and processing circuitry 1441 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving. In some examples, the communication and processing circuitry 1441 may include functionality for a means for decoding.

In some implementations wherein the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., a means for transmitting). In some examples, the communication and processing circuitry 1441 may include functionality for a means for encoding.

The processor 1404 may include forwarding configuration circuitry 1442 configured to perform forwarding configuration-related operations as discussed herein (e.g., one or more of the operations described in conjunction with FIGS. 4-11). The forwarding configuration circuitry 1442 may be configured to execute forwarding configuration software 1452 included on the computer-readable medium 1406 to implement one or more functions described herein.

The forwarding configuration circuitry 1442 may include functionality for a means for receiving forwarding capability information (e.g., as described above in conjunction with FIGS. 9-11). For example, the forwarding configuration circuitry 1442 may be configured to process a capabilities message received from an assisting node and parse the message to determine the capabilities of the assisting node that relate to forwarding operations.

The forwarding configuration circuitry 1442 may include functionality for a means for transmitting a forwarding configuration (e.g., as described above in conjunction with FIGS. 9-11). For example, the forwarding configuration circuitry 1442 may be configured to determine a forwarding configuration for an assisting node based on the capabilities of the assisting node. In addition, the forwarding configuration circuitry 1442 may be configured to negotiate with at least one other node to determine the forwarding configuration. The forwarding configuration circuitry 1442 may be configured to generate a message including the forwarding configuration and cause the message to be sent to the assisting node and/or at least one other node.

The processor 1404 may include priority configuration circuitry 1443 configured to perform priority configuration-related operations as discussed herein (e.g., one or more of the operations described in conjunction with FIGS. 4-11). The priority configuration circuitry 1443 may be configured to execute priority configuration software 1453 included on the computer-readable medium 1406 to implement one or more functions described herein.

The priority configuration circuitry 1443 may include functionality for a means for configuring one or more priorities (e.g., as described above in conjunction with FIGS. 9-11). For example, the priority configuration circuitry 1443 may be configured to determine at least one prioritization rule to be used by an assisting node for conflict resolution. As another example, the priority configuration circuitry 1443 may be configured to negotiate with at least one other node to determine at least one prioritization rule to be used by an assisting node for conflict resolution.

FIG. 15 is a flow chart illustrating an example method 1500 for wireless communication in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the wireless communication device 1400 illustrated in FIG. 14. In some examples, the method 1500 may be carried out by any suitable apparatus or means for carrying out the functions or algorithm described below.

At block 1502, a first wireless communication device may receive forwarding capability information of a second wireless communication device. In some examples, the forwarding configuration circuitry 1442 together with the communication and processing circuitry 1441 and the transceiver 1410, shown and described in FIG. 14, may provide a means to receive forwarding capability information of a second wireless communication device.

At block 1504, the first wireless communication device may transmit a forwarding configuration for a first type of wireless communication link and a second type of wireless communication link to the second wireless communication device, the forwarding configuration being based on the forwarding capability information, the second type of wireless communication link being different from the first type of wireless communication link. In some examples, the forwarding configuration circuitry 1442 together with the communication and processing circuitry 1441 and the transceiver 1410, shown and described in FIG. 14, may provide a means to transmit a forwarding configuration for a first type of wireless communication link and a second type of wireless communication link to the second wireless communication device.

In some examples, the first wireless communication device may transmit first signals to be relayed by the second wireless communication device on the first type of wireless communication link according to the forwarding configuration. In some examples, the first wireless communication device may receive second signals relayed by the second wireless communication device on the first type of wireless communication link according to the forwarding configuration.

In some examples, the first type of wireless communication link is a Uu link. In some examples, the second type of wireless communication link is a PC5 link.

In some examples, the forwarding capability information may include at least one of a time division multiplexing requirement, a frequency division multiplexing requirement, a spatial division multiplexing capability, or a combination thereof. In some examples, the forwarding capability information may include at least one of a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

In some examples, the first wireless communication device may receive the forwarding configuration via broadcast signaling, multicast signaling, or unicast signaling. In some examples, the first wireless communication device may receive the forwarding configuration from at least one of the second wireless communication device, a first user equipment associated with the first type of wireless communication link, a second user equipment associated with the second type of wireless communication link, or a combination thereof.

In some examples, the first wireless communication device may transmit the forwarding configuration to at least one third wireless communication device. In some examples, the at least one third wireless communication device may include at least one of a first user equipment associated with the first type of wireless communication link, a second user equipment associated with the second type of wireless communication link, or a combination thereof.

In some examples, the first wireless communication device may collaborate with at least one second wireless communication device to determine the forwarding configuration. In some examples, the first wireless communication device may collaborate with at least one third wireless communication device to determine the forwarding configuration. In some examples, the at least one third wireless communication device may include at least one of a first user equipment associated with the first type of wireless communication link, a second user equipment associated with the second type of wireless communication link, or a combination thereof.

In some examples, the first wireless communication device may determine the forwarding configuration based on at least one of a first configuration of the first type of wireless communication link, a second configuration of the second type of wireless communication link, or a combination thereof.

In some examples, the forwarding configuration specifies a forwarding method for the first type of wireless communication link and the second type of wireless communication link.

In some examples, the forwarding configuration specifies a first forwarding configuration for the first type of wireless communication link and a second forwarding configuration for the second type of wireless communication link. In some examples, the first wireless communication device may generate the first forwarding configuration for the first type of wireless communication link. In some examples, the first wireless communication device may receive the second forwarding configuration from a user equipment associated with the second type of wireless communication link.

In some examples, the first wireless communication device may receive an indication of a conflict in the forwarding configuration. In some examples, the first wireless communication device may modify a forwarding operation based on the conflict. In some examples, the forwarding operation is associated with forwarding of first signals via the first type of wireless communication link and second signals via the second type of wireless communication link. In some examples, the first wireless communication device may transmit an indication of the conflict to a second wireless communication device associated with the first type of wireless communication link, to a third wireless communication device associated with the second type of wireless communication link, or to the second wireless communication device and the third wireless communication device.

In some examples, the first wireless communication device may cancel a first forwarding operation configured for the first type of wireless communication link based on the indication. In some examples, the first wireless communication device may partially cancel a first forwarding operation configured for the first type of wireless communication link based on the indication. In some examples, the first wireless communication device may reconfigure a first forwarding operation configured for the first type of wireless communication link based on the indication. In some examples, the first wireless communication device may prioritize a first forwarding operation configured for the first type of wireless communication link over a second forwarding operation configured for the second type of wireless communication link.

In some examples, the first wireless communication device may determine at least one prioritization rule for the second wireless communication device to use for conflict resolution for the forwarding configuration. In some examples, the first wireless communication device may transmit the at least one prioritization rule to the second wireless communication device. In some examples, the first wireless communication device may collaborate with the second wireless communication device to determine the at least one prioritization rule. In some examples, the first wireless communication device may collaborate with at least one third wireless communication device to determine the at least one prioritization rule.

In some examples, the first wireless communication device may determine priority information for the second wireless communication device to use for conflict resolution for the forwarding configuration. In some examples, the first wireless communication device may transmit the priority information to the second wireless communication device. In some examples, the priority information may include a hierarchy of access priorities for a plurality of user equipment. In some examples, the priority information may include a first priority indication received from a second wireless communication device associated with the first type of wireless communication link and a second priority indication received from a third wireless communication device associated with the second type of wireless communication link.

In some examples, the first wireless communication device is a network node (e.g., a base station, a DU, a CU, etc.) or a user equipment. In some examples, the second wireless communication device is a repeater, a relay, or a reflector.

In one configuration, the wireless communication device 1400 includes means for receiving forwarding capability information of a second wireless communication device, and means for transmitting a forwarding configuration for a first type of wireless communication link and a second type of wireless communication link to the second wireless communication device. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 4, 5, 8-12, and 14, and utilizing, for example, the methods and/or algorithms described herein in relation to FIG. 15.

Figure 16:
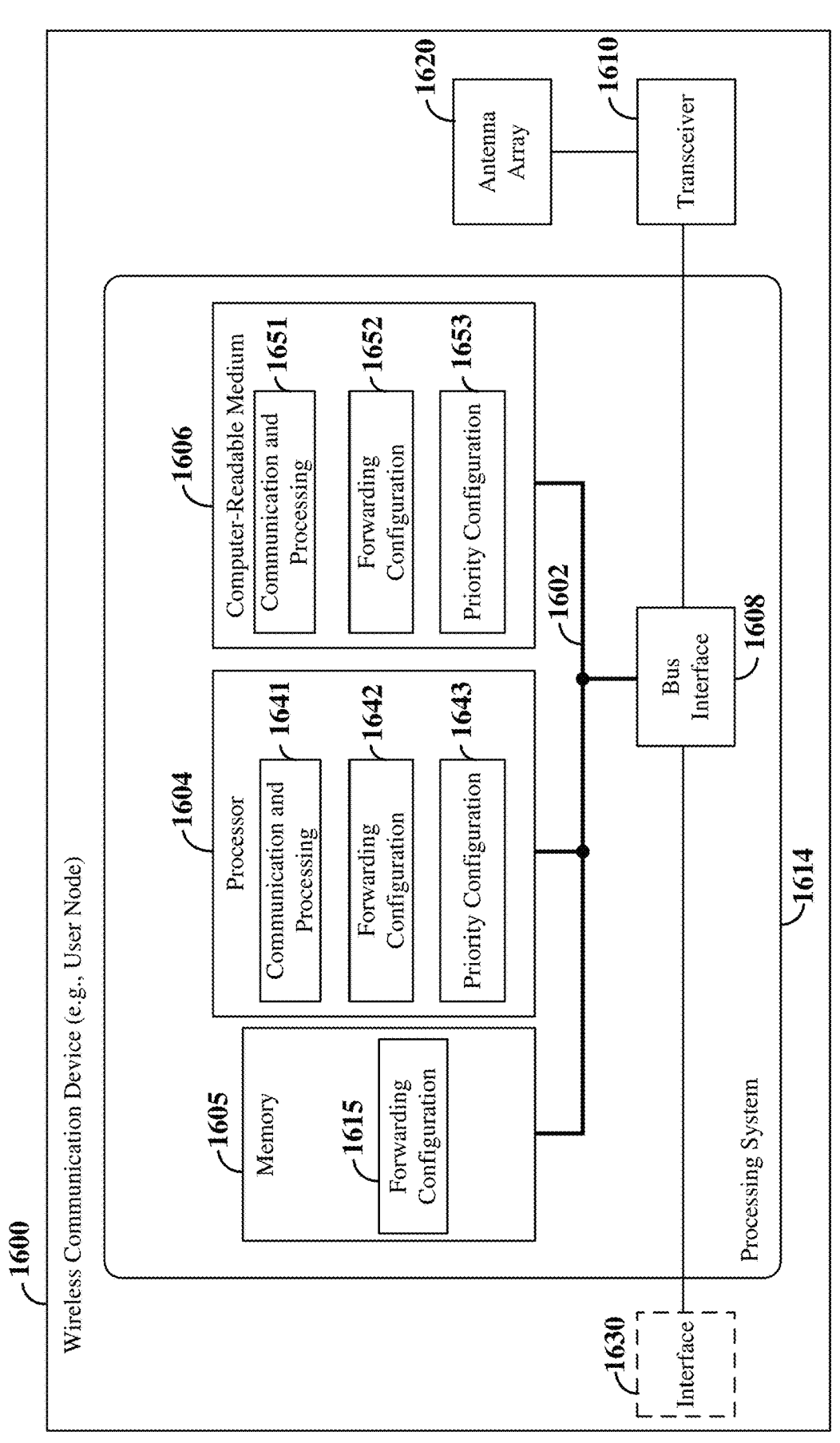
FIG. 16 is a block diagram conceptually illustrating an example of a hardware implementation for a wireless communication device (e.g., a user node) employing a processing system according to some aspects.

FIG. 16 is a block diagram illustrating an example of a hardware implementation for a wireless communication device 1600 employing a processing system 1614. In some examples, the wireless communication device 1600 may be a UE or scheduled entity configured to wirelessly communicate with a network node, base station, or scheduling entity, as discussed in any one or more of FIGS. 1-11. In some examples, the wireless communication device 1600 may correspond to any of the remote devices, UEs, sidelink devices, D2D devices, DUs, or scheduled entities shown in any of FIGS. 1, 2, 4, 5, and 8-11.

In accordance with various aspects of the disclosure, an element, or any portion of an element, or any combination of elements may be implemented with the processing system 1614. The processing system may include one or more processors 1604. The processing system 1614 may be substantially the same as the processing system 1214 illustrated in FIG. 12, including a bus interface 1608, a bus 1602, memory 1605, a processor 1604, a computer-readable medium 1606, a transceiver 1610, and an antenna array 1620. The memory 1605 may store forwarding configuration information 1615 used by the processor 1604 in cooperation with the transceiver 1610 for the forwarding-related operations described herein. Furthermore, the wireless communication device 1600 may include an interface 1630 that provides a means for communicating with at least one other apparatus within a core network and with at least one radio access network.

In some examples, the processor 1604 may in some instances be implemented via a baseband or modem chip and in other implementations, the processor 1604 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

The wireless communication device 1600 may be configured to perform any one or more of the operations described herein (e.g., as described above in conjunction with FIGS. 1-11 and as described below in conjunction with FIG. 17). In some aspects of the disclosure, the processor 1604, as utilized in the wireless communication device 1600, may include circuitry configured for various functions.

The processor 1604 may include communication and processing circuitry 1641. The communication and processing circuitry 1641 may be configured to communicate with a scheduling entity (e.g., a network node, such as a base station). The communication and processing circuitry 1641 may be configured to communicate with a base station and one or more other wireless communication devices over a common carrier shared between a cellular (e.g., Uu) interface and a sidelink (e.g., PC5) interface. The communication and processing circuitry 1641 may be configured to communicate with one or more other wireless communication devices over a cellular (e.g., Uu) interface and/or a sidelink (e.g., PC5) interface. The communication and processing circuitry 1641 may include one or more hardware components that provide the physical structure that performs various processes related to wireless communication (e.g., signal reception and/or signal transmission) as described herein. The communication and processing circuitry 1641 may further include one or more hardware components that provide the physical structure that performs various processes related to signal processing (e.g., processing a received signal and/or processing a signal for transmission) as described herein. In some examples, the communication and processing circuitry 1641 may include two or more transmit/receive chains (e.g., one chain to communicate with a base station and another chain to communicate with a sidelink device, or one chain to communicate with a first UE and another chain to communicate with another UE, etc.). The communication and processing circuitry 1641 may further be configured to execute communication and processing software 1651 included on the computer-readable medium 1606 to implement one or more functions described herein.

In some implementations wherein the communication involves receiving information, the communication and processing circuitry 1641 may obtain information from a component of the wireless communication device 1600 (e.g., from the transceiver 1610 that receives the information via radio frequency signaling or some other type of signaling suitable for the applicable communication medium), process (e.g., decode) the information, and output the processed information. For example, the communication and processing circuitry 1641 may output the information to another component of the processor 1604, to the memory 1605, or to the bus interface 1608. In some examples, the communication and processing circuitry 1641 may receive one or more of signals, messages, other information, or any combination thereof. In some examples, the communication and processing circuitry 1641 may receive information via one or more channels. In some examples, the communication and processing circuitry 1641 may include functionality for a means for receiving. In some examples, the communication and processing circuitry 1641 may include functionality for a means for decoding.

In some implementations wherein the communication involves sending (e.g., transmitting) information, the communication and processing circuitry 1641 may obtain information (e.g., from another component of the processor 1604, the memory 1605, or the bus interface 1608), process (e.g., encode) the information, and output the processed information. For example, the communication and processing circuitry 1641 may output the information to the transceiver 1610 (e.g., that transmits the information via radio frequency signaling or some other type of signaling suitable for the applicable communication medium). In some examples, the communication and processing circuitry 1641 may send one or more of signals, messages, other information, or any combination thereof. In some examples, the communication and processing circuitry 1641 may send information via one or more channels. In some examples, the communication and processing circuitry 1641 may include functionality for a means for sending (e.g., a means for transmitting). In some examples, the communication and processing circuitry 1641 may include functionality for a means for encoding.

The processor 1604 may include forwarding configuration circuitry 1642 configured to perform forwarding configuration-related operations as discussed herein (e.g., one or more of the operations described in conjunction with FIGS. 4-11). The forwarding configuration circuitry 1642 may be configured to execute forwarding configuration software 1652 included on the computer-readable medium 1606 to implement one or more functions described herein.

The forwarding configuration circuitry 1642 may include functionality for a means for receiving a forwarding configuration (e.g., as described above in conjunction with FIGS. 9-11). For example, the forwarding configuration circuitry 1642 may be configured to receive a message including a forwarding configuration that is based on the capabilities of the assisting node. In addition, the forwarding configuration circuitry 1642 may be configured to negotiate with at least one other node to determine the forwarding configuration.

The forwarding configuration circuitry 1642 may include functionality for a means for transmitting signals to be relayed or receiving signals that have been relayed (e.g., as described above in conjunction with FIGS. 9-11). For example, the forwarding configuration circuitry 1642 may be configured to transmit signals to be relayed by an assisting node according to the forwarding configuration. As another example, the forwarding configuration circuitry 1642 may be configured to receive signals that were relayed by an assisting node according to the forwarding configuration.

The processor 1604 may include priority configuration circuitry 1643 configured to perform priority configuration-related operations as discussed herein (e.g., one or more of the operations described in conjunction with FIGS. 4-11). The priority configuration circuitry 1643 may be configured to execute priority configuration software 1653 included on the computer-readable medium 1606 to implement one or more functions described herein.

The priority configuration circuitry 1643 may include functionality for a means for communicating priority information (e.g., as described above in conjunction with FIGS. 9-11). For example, the priority configuration circuitry 1643 may be configured to receive priority information including a hierarchy of access priorities for a plurality of UEs. As another example, the priority configuration circuitry 1643 may be configured to transmit an indication of a priority of the wireless communication device 1600 to an assisting node.

Figure 17:
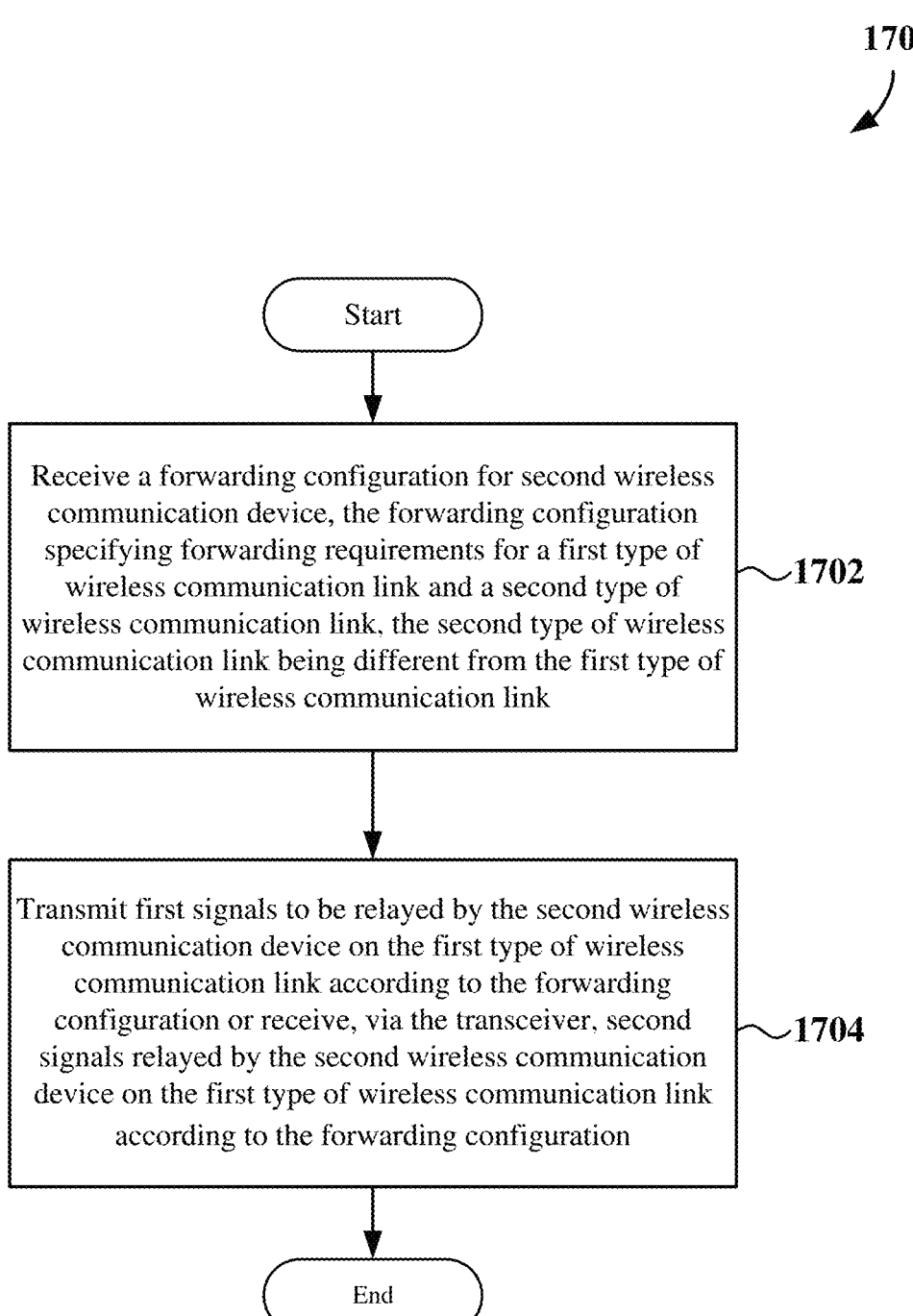
FIG. 17 is a flow chart illustrating an example wireless communication method relating to forwarded signals according to some aspects.

FIG. 17 is a flow chart illustrating an example method 1700 for wireless communication in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the wireless communication device 1600 illustrated in FIG. 16. In some examples, the method 1700 may be carried out by any suitable apparatus or means for carrying out the functions or algorithm described below.

At block 1702, a first wireless communication device may receive a forwarding configuration for second wireless communication device, the forwarding configuration specifying forwarding requirements for a first type of wireless communication link and a second type of wireless communication link, the second type of wireless communication link being different from the first type of wireless communication link. In some examples, the forwarding configuration circuitry 1642 together with the communication and processing circuitry 1541 and the transceiver 1510, shown and described in FIG. 15, may provide a means to receive a forwarding configuration for second wireless communication device.

At block 1704, the wireless communication device may transmit first signals to be relayed by the second wireless communication device on the first type of wireless communication link according to the forwarding configuration or receive second signals relayed by the second wireless communication device on the first type of wireless communication link according to the forwarding configuration. In some examples, the forwarding configuration circuitry 1642 together with the communication and processing circuitry 1541 and the transceiver 1510, shown and described in FIG. 15, may provide a means to transmit first signals to be relayed by the second wireless communication device on the first type of wireless communication link according to the forwarding configuration or receive second signals relayed by the second wireless communication device on the first type of wireless communication link according to the forwarding configuration.

In some examples, the first type of wireless communication link is a Uu link. In some examples, the second type of wireless communication link is a PC5 link.

In some examples, the first wireless communication device may receive forwarding capability information of the second wireless communication device. In some examples, the first wireless communication device may determine to use the second wireless communication device for a forwarding operation based on the forwarding capability information, transmit a request to use the second wireless communication device for the forwarding operation, and receive a response to the request, the response authorizing use of the second wireless communication device for the forwarding operation.

In some examples, the forwarding capability information may include at least one of a time division multiplexing requirement, a frequency division multiplexing requirement, a spatial division multiplexing capability, or a combination thereof. In some examples, the forwarding capability information may include at least one of a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

In some examples, the first wireless communication device may receive the forwarding configuration via broadcast signaling, multicast signaling, or unicast signaling. In some examples, the first wireless communication device may receive the forwarding configuration from at least one of the second wireless communication device, a network node (e.g., a base station, a DU, a CU, etc.) associated with the first type of wireless communication link, a first user equipment associated with the first type of wireless communication link, a second user equipment associated with the second type of wireless communication link, or a combination thereof. In some examples, the first wireless communication device may transmit the forwarding configuration to at least one third wireless communication device.

In some examples, the forwarding configuration specifies a forwarding method for the first type of wireless communication link and the second type of wireless communication link. In some examples, the forwarding configuration specifies a first forwarding configuration for the first type of wireless communication link and a second forwarding configuration for the second type of wireless communication link.

In some examples, the first wireless communication device may receive an indication of a conflict in the forwarding configuration. In some examples, the first wireless communication device may modify a forwarding operation based on the conflict. In some examples, the forwarding operation is associated with forwarding of the first signals via the first type of wireless communication link and forwarding of second signals via the second type of wireless communication link.

In some examples, the first wireless communication device may cancel a first forwarding operation configured for the first type of wireless communication link based on the indication. In some examples, the first wireless communication device may partially cancel a first forwarding operation configured for the first type of wireless communication link based on the indication. In some examples, the first wireless communication device may reconfigure a first forwarding operation configured for the first type of wireless communication link based on the indication. In some examples, the first wireless communication device may prioritize a first forwarding operation configured for the first type of wireless communication link over a second forwarding operation configured for the second type of wireless communication link.

In some examples, the first wireless communication device may receive priority information. In some examples, the first wireless communication device may transmit the priority information to the second wireless communication device. In some examples, the priority information may include a hierarchy of access priorities for a plurality of user equipment. In some examples, the priority information may include a first priority indication received from a second wireless communication device associated with the first type of wireless communication link and a second priority indication received from a third wireless communication device associated with the second type of wireless communication link.

In some examples, the first wireless communication device is a user equipment. In some examples, the second wireless communication device is a repeater, a relay, or a reflector.

In one configuration, the wireless communication device 1600 includes means for receiving a forwarding configuration for second wireless communication device, and means for transmitting first signals to be relayed by the second wireless communication device on the first type of wireless communication link according to the forwarding configuration or receiving second signals relayed by the second wireless communication device on the first type of wireless communication link according to the forwarding configuration. In one aspect, the aforementioned means may be the processor 1604 shown in FIG. 16 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable medium 1606, or any other suitable apparatus or means described in any one or more of FIGS. 1, 2, 4, 5, 8, 9-11, and 16, and utilizing, for example, the methods and/or algorithms described herein in relation to FIG. 17.

The methods shown in FIGS. 13, 15, and 17 may include additional aspects, such as any single aspect or any combination of aspects described below and/or in connection with one or more other processes described elsewhere herein. The following provides an overview of several aspects of the present disclosure.

Aspect 1: A method for wireless communication at a first wireless communication device, the method comprising: receiving first signals for a first type of wireless communication link; receiving second signals for a second type of wireless communication link, the second type of wireless communication link being different from the first type of wireless communication link; and forwarding the first signals and the second signals according to a forwarding configuration for the first type of wireless communication link and the second type of wireless communication link.

Aspect 2: The method of aspect 1, wherein: the first type of wireless communication link comprises a Uu link; and the second type of wireless communication link comprises a PC5 link.

Aspect 3: The method of aspect 1 or 2, further comprising: transmitting forwarding capability information of the first wireless communication device.

Aspect 4: The method of aspect 3, further comprising: transmitting the forwarding capability information of the first wireless communication device via at least one of: broadcast signaling, multicast signaling, unicast signaling, first signaling on the first type of wireless communication link, second signaling on the second type of wireless communication link, or a combination thereof.

Aspect 5: The method of any of aspects 3 through 4, wherein the forwarding capability information comprises at least one of: a time division multiplexing requirement, a frequency division multiplexing requirement, a spatial division multiplexing capability, or a combination thereof.

Aspect 6: The method of any of aspects 3 through 5, wherein the forwarding capability information comprises at least one of: a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

Aspect 7: The method of any of aspects 1 through 6, further comprising: receiving the forwarding configuration.

Aspect 8: The method of any of aspects 1 through 7, further comprising: collaborating with at least one second wireless communication device to determine the forwarding configuration.

Aspect 9: The method of aspect 8, further comprising: determining the forwarding configuration based on at least one of: forwarding capability information of the first wireless communication device, a first configuration of the first type of wireless communication link, a second configuration of the second type of wireless communication link, or a combination thereof.

Aspect 10: The method of any of aspects 8 through 9, wherein the at least one second wireless communication device comprises at least one of: a network node associated with the first type of wireless communication link, a first user equipment associated with the first type of wireless communication link, a second user equipment associated with the second type of wireless communication link, or a combination thereof.

Aspect 11: The method of any of aspects 1 through 10, further comprising: receiving the forwarding configuration from at least one of: a network node associated with the first type of wireless communication link, a user equipment associated with the second type of wireless communication link, or a combination thereof.

Aspect 12: The method of any of aspects 1 through 11, wherein the forwarding configuration specifies a forwarding method for the first type of wireless communication link and the second type of wireless communication link.

Aspect 13: The method of any of aspects 1 through 11, wherein the forwarding configuration specifies a first forwarding configuration for the first type of wireless communication link and a second forwarding configuration for the second type of wireless communication link.

Aspect 14: The method of aspect 13, further comprising: receiving the first forwarding configuration from a network node associated with the first type of wireless communication link; and receiving the second forwarding configuration from a user equipment associated with the second type of wireless communication link.

Aspect 15: The method of aspect 13, further comprising: receiving the first forwarding configuration from a first user equipment associated with the first type of wireless communication link; and receiving the second forwarding configuration from a second user equipment associated with the second type of wireless communication link.

Aspect 16: The method of any of aspects 1 through 15, further comprising: identifying a conflict in the forwarding configuration; and modifying a forwarding operation based on the conflict.

Aspect 17: The method of aspect 16, further comprising: transmitting an indication of the conflict to a second wireless communication device associated with the first type of wireless communication link, to a third wireless communication device associated with the second type of wireless communication link, or to the second wireless communication device and the third wireless communication device.

Aspect 18: The method of any of aspects 16 through 17, wherein the modifying the forwarding operation based on the conflict comprises: canceling a first forwarding operation configured for the first type of wireless communication link; and canceling a second forwarding operation configured for the second type of wireless communication link.

Aspect 19: The method of any of aspects 16 through 17, wherein the modifying the forwarding operation based on the conflict comprises: prioritizing a first forwarding operation configured for the first type of wireless communication link over a second forwarding operation configured for the second type of wireless communication link.

Aspect 20: The method of aspect 19, further comprising: prioritizing the first forwarding operation over the second forwarding operation based on at least one prioritization rule.

Aspect 21: The method of aspect 20, wherein the at least one prioritization rule is: preconfigured into the first wireless communication device; received from a second wireless communication device associated with the first type of wireless communication link; received from a third wireless communication device associated with the second type of wireless communication link; or collaborated between at least two of the first wireless communication device, the second wireless communication device, and the third wireless communication device.

Aspect 22: The method of any of aspects 19 through 21, further comprising: receiving priority information; and prioritizing the first forwarding operation over the second forwarding operation based on the priority information.

Aspect 23: The method of aspect 22, wherein the priority information comprises a hierarchy of access priorities for a plurality of user equipment.

Aspect 24: The method of aspect 22, wherein: the priority information comprises a first priority indication received from a second wireless communication device associated with the first type of wireless communication link and a second priority indication received from a third wireless communication device associated with the second type of wireless communication link; and the method further comprises prioritizing the first forwarding operation over the second forwarding operation based on the first priority indication and the second priority indication.

Aspect 25: The method of aspect 19, further comprising: prioritizing the first forwarding operation over the second forwarding operation based on at least one of: the first type of wireless communication link, the second type of wireless communication link, a first priority of the first type of wireless communication link, a second priority of the second type of wireless communication link, a first type of signal carried by the first type of wireless communication link, a second type of signal carried by the second type of wireless communication link, a first type of transmission on the first type of wireless communication link, a second type of transmission on the second type of wireless communication link, a first direction of traffic on the first type of wireless communication link, a second direction of traffic on the second type of wireless communication link, a first priority of a first user equipment associated with the first type of wireless communication link, a second priority of a second user equipment associated with the first type of wireless communication link, a first beam associated with the first type of wireless communication link, a second beam associated with the second type of wireless communication link, a first time associated with the forwarding configuration for the first type of wireless communication link and the second type of wireless communication link, a second time associated with the forwarding of the first signals and the second signals, a first type of a first forwarding configuration associated with the first type of wireless communication link, a second type of a second forwarding configuration associated with the second type of wireless communication link, a first method of configuration associated with the first type of wireless communication link, a second method of configuration associated with the second type of wireless communication link, a first type of a resource associated with the first type of wireless communication link, a second type of a resource associated with the second type of wireless communication link, a first bandwidth associated with the first type of wireless communication link, a second bandwidth associated with the second type of wireless communication link, an explicit priority indication, or a combination thereof.

Aspect 26: The method of aspect 16, wherein the modifying the forwarding operation based on the conflict comprises: maintaining a first forwarding operation configured for the first type of wireless communication link; and canceling a second forwarding operation configured for the second type of wireless communication link.

Aspect 27: The method of aspect 16, wherein the modifying the forwarding operation based on the conflict comprises: maintaining a first forwarding operation configured for the first type of wireless communication link; and partially canceling a second forwarding operation configured for the second type of wireless communication link.

Aspect 28: The method of aspect 16, wherein the modifying the forwarding operation based on the conflict comprises: maintaining a first forwarding operation configured for the first type of wireless communication link; and reconfiguring a second forwarding operation configured for the second type of wireless communication link.

Aspect 29: The method of any of aspects 1 through 28, wherein the first wireless communication device is a repeater, a relay, or a reflector.

Aspect 31: A method for wireless communication at a first wireless communication device, the method comprising: receiving forwarding capability information of a second wireless communication device; and transmitting a forwarding configuration for a first type of wireless communication link and a second type of wireless communication link to the second wireless communication device, the forwarding configuration being based on the forwarding capability information, the second type of wireless communication link being different from the first type of wireless communication link.

Aspect 32: The method of aspect 31, further comprising: transmitting first signals to be relayed by the second wireless communication device on the first type of wireless communication link according to the forwarding configuration; or receiving second signals relayed by the second wireless communication device on the first type of wireless communication link according to the forwarding configuration.

Aspect 33: The method of any of aspects 31 through 32, wherein: the first type of wireless communication link comprises a Uu link; and the second type of wireless communication link comprises a PC5 link.

Aspect 34: The method of any of aspects 31 through 32, wherein the forwarding capability information comprises at least one of: a time division multiplexing requirement, a frequency division multiplexing requirement, a spatial division multiplexing capability, or a combination thereof.

Aspect 35: The method of any of aspects 31 through 34, wherein the forwarding capability information comprises at least one of: a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

Aspect 36: The method of any of aspects 31 through 35, further comprising: receiving the forwarding capability information via broadcast signaling, multicast signaling, or unicast signaling.

Aspect 37: The method of any of aspects 31 through 36, further comprising: receiving the forwarding configuration from at least one of: the second wireless communication device, a first user equipment associated with the first type of wireless communication link, a second user equipment associated with the second type of wireless communication link, or a combination thereof.

Aspect 38: The method of any of aspects 31 through 37, further comprising: transmitting the forwarding configuration to at least one third wireless communication device.

Aspect 39: The method of aspect 38, wherein the at least one third wireless communication device comprises at least one of: a first user equipment associated with the first type of wireless communication link, a second user equipment associated with the second type of wireless communication link, or a combination thereof.

Aspect 40: The method of any of aspects 31 through 39, further comprising: collaborating with the second wireless communication device to determine the forwarding configuration.

Aspect 41: The method of aspect 40, further comprising: collaborating with at least one third wireless communication device to determine the forwarding configuration.

Aspect 42: The method of aspect 41, wherein the at least one third wireless communication device comprises at least one of: a first user equipment associated with the first type of wireless communication link, a second user equipment associated with the second type of wireless communication link, or a combination thereof.

Aspect 43: The method of any of aspects 31 through 42, further comprising: determining the forwarding configuration based on at least one of: a first configuration of the first type of wireless communication link, a second configuration of the second type of wireless communication link, or a combination thereof.

Aspect 44: The method of any of aspects 31 through 43, wherein the forwarding configuration specifies a forwarding method for the first type of wireless communication link and the second type of wireless communication link.

Aspect 45: The method of any of aspects 31 through 43, wherein the forwarding configuration specifies a first forwarding configuration for the first type of wireless communication link and a second forwarding configuration for the second type of wireless communication link.

Aspect 46: The method of aspect 45, further comprising: generating the first forwarding configuration for the first type of wireless communication link; and receiving the second forwarding configuration from a user equipment associated with the second type of wireless communication link.

Aspect 47: The method of any of aspects 31 through 46, further comprising: receiving an indication of a conflict in the forwarding configuration.

Aspect 48: The method of aspect 47, further comprising: canceling a first forwarding operation configured for the first type of wireless communication link based on the indication.

Aspect 49: The method of aspect 47, further comprising: partially canceling a first forwarding operation configured for the first type of wireless communication link based on the indication.

Aspect 50: The method of aspect 47, further comprising: reconfiguring a first forwarding operation configured for the first type of wireless communication link based on the indication.

Aspect 51: The method of any of aspects 31 through 50, further comprising: determining at least one prioritization rule for the second wireless communication device to use for conflict resolution for the forwarding configuration.

Aspect 52: The method of aspect 51, further comprising: transmitting the at least one prioritization rule to the second wireless communication device.

Aspect 53: The method of any of aspects 51 through 52, further comprising: collaborating with the second wireless communication device to determine the at least one prioritization rule.

Aspect 54: The method of any of aspects 51 through 53, further comprising: collaborating with at least one third wireless communication device to determine the at least one prioritization rule.

Aspect 55: The method of any of aspects 31 through 54, further comprising: determining priority information for the second wireless communication device to use for conflict resolution for the forwarding configuration.

Aspect 56: The method of aspect 55, wherein the priority information comprises a hierarchy of access priorities for a plurality of user equipment.

Aspect 57: The method of any of aspects 55 through 56, further comprising: transmitting the priority information to the second wireless communication device.

Aspect 58: The method of any of aspects 31 through 57, wherein the first wireless communication device is a network node or a user equipment.

Aspect 59: The method of any of aspects 31 through 58, wherein the second wireless communication device is a repeater, a relay, or a reflector.

Aspect 61: A method for wireless communication at a first wireless communication device, the method comprising: receiving a forwarding configuration for second wireless communication device, the forwarding configuration specifying forwarding requirements for a first type of wireless communication link and a second type of wireless communication link, the second type of wireless communication link being different from the first type of wireless communication link; and transmitting first signals to be relayed by the second wireless communication device on the first type of wireless communication link according to the forwarding configuration or receive second signals relayed by the second wireless communication device on the first type of wireless communication link according to the forwarding configuration.

Aspect 62: The method of aspect 61, wherein: the first type of wireless communication link comprises a Uu link; and the second type of wireless communication link comprises a PC5 link.

Aspect 63: The method of any of aspects 61 through 62, further comprising: receiving forwarding capability information of the second wireless communication device.

Aspect 64: The method of aspect 63, further comprising: determining to use the second wireless communication device for a forwarding operation based on the forwarding capability information; transmitting a request to use the second wireless communication device for the forwarding operation; and receiving a response to the request, the response authorizing use of the second wireless communication device for the forwarding operation.

Aspect 65: The method of any of aspects 63 through 64, wherein the forwarding capability information comprises at least one of: a time division multiplexing requirement, a frequency division multiplexing requirement, a spatial division multiplexing capability, or a combination thereof.

Aspect 66: The method of any of aspects 63 through 65, wherein the forwarding capability information comprises at least one of: a required quantity of guard symbols for time division multiplexing, a minimum guard band for frequency division multiplexing, available transmit beams and receive beans for spatial division multiplexing, a time alignment requirement, a transmit power configuration, a power consumption configuration, a quality of service requirement, a beamforming configuration, an identifier of a cell associated with the forwarding capability information, an identifier of a user equipment associated with the forwarding capability information, an identifier of a wireless communication link associated with the forwarding capability information, an identifier of a bandwidth associated with the forwarding capability information, a wireless communication link transition type, or a combination thereof.

Aspect 67: The method of any of aspects 61 through 66, further comprising: receiving the forwarding capability information via broadcast signaling, multicast signaling, or unicast signaling.

Aspect 68: The method of any of aspects 61 through 67, further comprising: receiving the forwarding configuration from at least one of: the second wireless communication device, a network node associated with the first type of wireless communication link, a first user equipment associated with the first type of wireless communication link, a second user equipment associated with the second type of wireless communication link, or a combination thereof.

Aspect 69: The method of aspect 68, further comprising: transmitting the forwarding configuration to at least one third wireless communication device.

Aspect 70: The method of any of aspects 68 through 69, wherein the forwarding configuration specifies a forwarding method for the first type of wireless communication link and the second type of wireless communication link.

Aspect 71: The method of any of aspects 68 through 69, wherein the forwarding configuration specifies a first forwarding configuration for the first type of wireless communication link and a second forwarding configuration for the second type of wireless communication link.

Aspect 72: The method of any of aspects 61 through 71, further comprising: receiving an indication of a conflict in the forwarding configuration.

Aspect 73: The method of aspect 72, further comprising: canceling a first forwarding operation configured for the first type of wireless communication link based on the indication.

Aspect 74: The method of aspect 72, further comprising: partially canceling a first forwarding operation configured for the first type of wireless communication link based on the indication.

Aspect 75: The method of aspect 72, further comprising: reconfiguring a first forwarding operation configured for the first type of wireless communication link based on the indication.

Aspect 76: The method of any of aspects 61 through 75, further comprising: receiving priority information comprising a hierarchy of access priorities for a plurality of user equipment.

Aspect 77: The method of aspect 76, further comprising: transmitting the priority information to the second wireless communication device.

Aspect 78: The method of any of aspects 61 through 77, wherein the first wireless communication device is a user equipment.

Aspect 79: The method of any of aspects 61 through 78, wherein the second wireless communication device is a repeater, a relay, or a reflector.

Aspect 80: A wireless communication device comprising: a transceiver, a memory, and a processor coupled to the transceiver and the memory, wherein the processor is configured to perform any one or more of aspects 1 through 29.

Aspect 81: An apparatus configured for wireless communication comprising at least one means for performing any one or more of aspects 1 through 29.

Aspect 82: A non-transitory computer-readable medium storing computer-executable code, comprising code for causing an apparatus to perform any one or more of aspects 1 through 29.

Aspect 83: A wireless communication device comprising: a transceiver, a memory, and a processor coupled to the transceiver and the memory, wherein the processor is configured to perform any one or more of aspects 31 through 59.

Aspect 84: An apparatus configured for wireless communication comprising at least one means for performing any one or more of aspects 31 through 59.

Aspect 85: A non-transitory computer-readable medium storing computer-executable code, comprising code for causing an apparatus to perform any one or more of aspects 31 through 59.

Aspect 86: A wireless communication device comprising: a transceiver, a memory, and a processor coupled to the transceiver and the memory, wherein the processor is configured to perform any one or more of aspects 61 through 79.

Aspect 87: An apparatus configured for wireless communication comprising at least one means for performing any one or more of aspects 61 through 79.

Aspect 88: A non-transitory computer-readable medium storing computer-executable code, comprising code for causing an apparatus to perform any one or more of aspects 61 through 79.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-12, 14, and 16 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device, comprising:
one or more memories that store processor-executable code; and
one or more processors configured to execute the processor-executable code and cause the first wireless communication device to:
transmit forwarding capability information of the first wireless communication device, wherein the forwarding capability information indicates that the first wireless communication device supports forwarding via a first type of wireless communication link and a second type of wireless communication link, and the second type of wireless communication link is different from the first type of wireless communication link;
receive a forwarding configuration for the first type of wireless communication link and the second type of wireless communication link, the forwarding configuration being based on the forwarding capability information;
simultaneously receive first signals via the first type of wireless communication link and second signals via the second type of wireless communication link; and
simultaneously forward the first signals and the second signals according to the forwarding configuration, the first signals being forwarded via the first type of wireless communication link and the second signals being forwarded via the second type of wireless communication link.

2. The first wireless communication device of claim 1, wherein:
the first type of wireless communication link comprises a Uu link; and
the second type of wireless communication link comprises a PC5 link.

3. The first wireless communication device of claim 1, wherein the one or more processors are further configured to execute the processor-executable code and cause the first wireless communication device to:
transmit the forwarding capability information of the first wireless communication device via at least one of: broadcast signaling, multicast signaling, unicast signaling, first signaling on the first type of wireless communication link, second signaling on the second type of wireless communication link, or a combination thereof.

4. The first wireless communication device of claim 1, wherein the forwarding capability information comprises at least one of: a time division multiplexing requirement, a frequency division multiplexing requirement, a spatial division multiplexing capability, or a combination thereof.

5. The first wireless communication device of claim 1, wherein the forwarding capability information comprises at least one of:
   a required quantity of guard symbols for time division multiplexing,
   a minimum guard band for frequency division multiplexing,
   available transmit beams and receive beans for spatial division multiplexing,
   a time alignment requirement,
   a transmit power configuration,
   a power consumption configuration,
   a quality of service requirement,
   a beamforming configuration,
   an identifier of a cell associated with the forwarding capability information,
   an identifier of a user equipment associated with the forwarding capability information,
   an identifier of a wireless communication link associated with the forwarding capability information,
   an identifier of a bandwidth associated with the forwarding capability information,
   a wireless communication link transition type,
   or a combination thereof.

6. The first wireless communication device of claim 1, wherein the one or more processors are further configured to execute the processor-executable code and cause the first wireless communication device to:
   collaborate with at least one second wireless communication device to determine the forwarding configuration.

7. The first wireless communication device of claim 6, wherein the one or more processors are further configured to execute the processor-executable code and cause the first wireless communication device to determine the forwarding configuration based on at least one of: the forwarding capability information of the first wireless communication device, a first configuration of the first type of wireless communication link, a second configuration of the second type of wireless communication link, or a combination thereof.

8. The first wireless communication device of claim 6, wherein the at least one second wireless communication device comprises at least one of: a network node associated with the first type of wireless communication link, a first user equipment associated with the first type of wireless communication link, a second user equipment associated with the second type of wireless communication link, or a combination thereof.

9. The first wireless communication device of claim 1, wherein the one or more processors are further configured to execute the processor-executable code and cause the first wireless communication device to:
   receive the forwarding configuration from at least one of:
   a network node associated with the first type of wireless communication link, a user equipment associated with the second type of wireless communication link, or a combination thereof.

10. The first wireless communication device of claim 1, wherein the forwarding configuration specifies a forwarding method for the first type of wireless communication link and the second type of wireless communication link.

11. The first wireless communication device of claim 1, wherein the forwarding configuration specifies a first forwarding configuration for the first type of wireless communication link and a second forwarding configuration for the second type of wireless communication link.

12. The first wireless communication device of claim 11, wherein the one or more processors are further configured to execute the processor-executable code and cause the first wireless communication device to:
   receive the first forwarding configuration from a network node associated with the first type of wireless communication link, and receive the second forwarding configuration from a user equipment associated with the second type of wireless communication link.

13. The first wireless communication device of claim 1, wherein the one or more processors are further configured to execute the processor-executable code and cause the first wireless communication device to:
   identify a conflict in the forwarding configuration; and
   modify a forwarding operation based on the conflict.

14. The first wireless communication device of claim 13, wherein the one or more processors are further configured to execute the processor-executable code and cause the first wireless communication device to:
   transmit an indication of the conflict to a second wireless communication device associated with the first type of wireless communication link, to a third wireless communication device associated with the second type of wireless communication link, or to the second wireless communication device and the third wireless communication device.

15. The first wireless communication device of claim 13, wherein, to modify the forwarding operation based on the conflict, the one or more processors are further configured to execute the processor-executable code and cause the first wireless communication device to:
   cancel a first forwarding operation configured for the first type of wireless communication link; and
   cancel a second forwarding operation configured for the second type of wireless communication link.

16. The first wireless communication device of claim 13, wherein, to modify the forwarding operation based on the conflict, the one or more processors are further configured to execute the processor-executable code and cause the first wireless communication device to:
   prioritize a first forwarding operation configured for the first type of wireless communication link over a second forwarding operation configured for the second type of wireless communication link.

17. The first wireless communication device of claim 16, wherein the one or more processors are further configured to execute the processor-executable code and cause the first wireless communication device to:
   prioritize the first forwarding operation over the second forwarding operation based on at least one prioritization rule.

18. The first wireless communication device of claim 17, wherein the at least one prioritization rule is:
   preconfigured into the first wireless communication device;
   received from a second wireless communication device associated with the first type of wireless communication link;

received from a third wireless communication device associated with the second type of wireless communication link; or collaborated between at least two of the first wireless communication device, the second wireless communication device, and the third wireless communication device.

19. The first wireless communication device of claim 16, wherein the one or more processors are further configured to execute the processor-executable code and cause the first wireless communication device to:

receive priority information; and prioritize the first forwarding operation over the second forwarding operation based on the priority information.

20. The first wireless communication device of claim 19, wherein the priority information comprises a hierarchy of access priorities for a plurality of user equipment.

21. The first wireless communication device of claim 19, wherein:

the priority information comprises a first priority indication received from a second wireless communication device associated with the first type of wireless communication link and a second priority indication received from a third wireless communication device associated with the second type of wireless communication link; and the one or more processors are further configured to execute the processor-executable code and cause the first wireless communication device to prioritize the first forwarding operation over the second forwarding operation based on the first priority indication and the second priority indication.

22. The first wireless communication device of claim 16, wherein the one or more processors are further configured to execute the processor-executable code and cause the first wireless communication device to prioritize the first forwarding operation over the second forwarding operation based on at least one of:

the first type of wireless communication link, the second type of wireless communication link, a first priority of the first type of wireless communication link, a second priority of the second type of wireless communication link, a first type of signal carried by the first type of wireless communication link, a second type of signal carried by the second type of wireless communication link, a first type of transmission on the first type of wireless communication link, a second type of transmission on the second type of wireless communication link, a first direction of traffic on the first type of wireless communication link, a second direction of traffic on the second type of wireless communication link, a first priority of a first user equipment associated with the first type of wireless communication link, a second priority of a second user equipment associated with the first type of wireless communication link, a first beam associated with the first type of wireless communication link, a second beam associated with the second type of wireless communication link, a first time associated with the forwarding configuration for the first type of wireless communication link and the second type of wireless communication link, a second time associated with the forwarding of the first signals and the second signals, a first type of a first forwarding configuration associated with the first type of wireless communication link, a second type of a second forwarding configuration associated with the second type of wireless communication link, a first method of configuration associated with the first type of wireless communication link, a second method of configuration associated with the second type of wireless communication link, a first type of a resource associated with the first type of wireless communication link, a second type of a resource associated with the second type of wireless communication link, a first bandwidth associated with the first type of wireless communication link, a second bandwidth associated with the second type of wireless communication link, an explicit priority indication, or a combination thereof.

23. The first wireless communication device of claim 13, wherein, to modify the forwarding operation based on the conflict, the one or more processors are further configured to execute the processor-executable code and cause the first wireless communication device to:

maintain a first forwarding operation configured for the first type of wireless communication link; and perform at least one of: cancel a second forwarding operation configured for the second type of wireless communication link, partially cancel the second forwarding operation configured for the second type of wireless communication link, or reconfigure the second forwarding operation configured for the second type of wireless communication link.

24. The first wireless communication device of claim 11, wherein the one or more processors are further configured to execute the processor-executable code and cause the first wireless communication device to:

receive the first forwarding configuration from a first user equipment associated with the first type of wireless communication link, and receive the second forwarding configuration from a second user equipment associated with the second type of wireless communication link.

25. The first wireless communication device of claim 1, wherein the one or more processors are further configured to execute the processor-executable code and cause the first wireless communication device to:

receive the first signals from a first user equipment via the first type of wireless communication link;

forward the first signals to a network entity via the first type of wireless communication link;

receive the second signals from a second user equipment via the second type of wireless communication link; and forward the second signals to a third user equipment via the second type of wireless communication link.

26. A method for wireless communication at a first wireless communication device, the method comprising:

transmitting forwarding capability information of the first wireless communication device, wherein the forwarding capability information indicates that the first wireless communication device supports forwarding via a first type of wireless communication link and a second type of wireless communication link, and the second type of wireless communication link is different from the first type of wireless communication link;

receiving a forwarding configuration for the first type of wireless communication link and the second type of wireless communication link, the forwarding configuration being based on the forwarding capability information;

simultaneously receiving first signals via the first type of wireless communication link and second signals via the second type of wireless communication link; and simultaneously forwarding the first signals and the second signals according to the forwarding configuration, the first signals being forwarded via the first type of wireless communication link and the second signals being forwarded via the second type of wireless communication link.

27. The method of claim 26, wherein:

the first type of wireless communication link comprises a Uu link; and the second type of wireless communication link comprises a PC5 link.

28. The method of claim 26, further comprising:

receiving the forwarding configuration from at least one of: a network node associated with the first type of wireless communication link, a user equipment associated with the second type of wireless communication link, or a combination thereof.

29. The method of claim 26, further comprising:

identifying a conflict in the forwarding configuration; and modifying a forwarding operation based on the conflict.

\*  \*  \*  \*  \*